United States Patent
Hufnagel et al.

(10) Patent No.: US 9,353,728 B2
(45) Date of Patent: May 31, 2016

(54) INVENTION RELATING TO ROTOR BLADES, IN PARTICULAR FOR WIND POWER INSTALLATIONS

(75) Inventors: Klaus Hufnagel, Hanau (DE); Benjamin Lambie, Heusenstamm (DE)

(73) Assignee: Technische Universität Darmstadt, Darmstadt (DE)

(*) Notice: Subject to any disclaimer, the term of this patent is extended or adjusted under 35 U.S.C. 154(b) by 811 days.

(21) Appl. No.: 13/697,056

(22) PCT Filed: May 10, 2011

(86) PCT No.: PCT/EP2011/057466
§ 371 (c)(1),
(2), (4) Date: Jan. 17, 2013

(87) PCT Pub. No.: WO2011/141444
PCT Pub. Date: Nov. 17, 2011

(65) Prior Publication Data
US 2013/0119673 A1    May 16, 2013

(30) Foreign Application Priority Data

May 10, 2010 (EP) .................................. 10162448

(51) Int. Cl.
| F03D 11/00 | (2006.01) |
| F03D 1/06 | (2006.01) |
| F03D 7/02 | (2006.01) |
| F03D 3/06 | (2006.01) |
| F03D 9/00 | (2016.01) |

(52) U.S. Cl.
CPC ............ *F03D 1/0658* (2013.01); *F03D 1/0633* (2013.01); *F03D 1/0675* (2013.01); *F03D 3/061* (2013.01); *F03D 7/024* (2013.01); *F03D 7/0232* (2013.01); *F03D 9/002* (2013.01); *F05B 2240/31* (2013.01); *F05B 2240/311* (2013.01); *F05B 2260/502* (2013.01); *Y02E 10/721* (2013.01); *Y02E 10/74* (2013.01)

(58) Field of Classification Search
CPC ....... F03D 1/0675; F03D 7/0232; F03D 7/24; F05B 2240/31; F05B 2240/311; F05B 2260/502; F05B 2260/75; F05B 2260/78; B64C 3/44; B64C 3/48; B64C 3/50; B64C 11/14
See application file for complete search history.

(56) References Cited

U.S. PATENT DOCUMENTS

| 2,055,928 | A | * | 9/1936 | Hays ...................... B64C 27/46 244/215 |
| 2,622,686 | A | | 12/1952 | chevreau et al. |
| 2,716,460 | A | | 8/1955 | Young |
| 3,332,383 | A | * | 7/1967 | Wright ................. B63H 9/0607 114/102.16 |
| 4,383,801 | A | | 5/1983 | Pryor |
| 5,181,678 | A | * | 1/1993 | Widnall ................... B64C 3/48 114/127 |
| 5,367,970 | A | * | 11/1994 | Beauchamp ............ B63B 1/248 114/140 |
| 2008/0175709 | A1 | | 7/2008 | Akcasu |

FOREIGN PATENT DOCUMENTS

FR    2 456 211    12/1980

* cited by examiner

*Primary Examiner* — Ninh H Nguyen
(74) *Attorney, Agent, or Firm* — Clark & Brody

(57) ABSTRACT

A rotor blade is provided, in particular for wind turbine generators including a means for the modification of the camber, wherein the modification of the camber is realized by means of elements passively coupled to one another, i.e. without external energy supply (apart from the energy contained in the airflow surrounding the rotor blade). One of the elements is therefore arranged at the leading and the trailing edge of the airfoil of the rotor blade, respectively. The coupling of the elements, the stiffness of the airfoil and the strength of the damping are hereby arranged in a manner suitable to be modified.

17 Claims, 26 Drawing Sheets

Practical embodiment with crank rod and joints, with control horns of the length L1 and L2 firmly connected to a single flap each

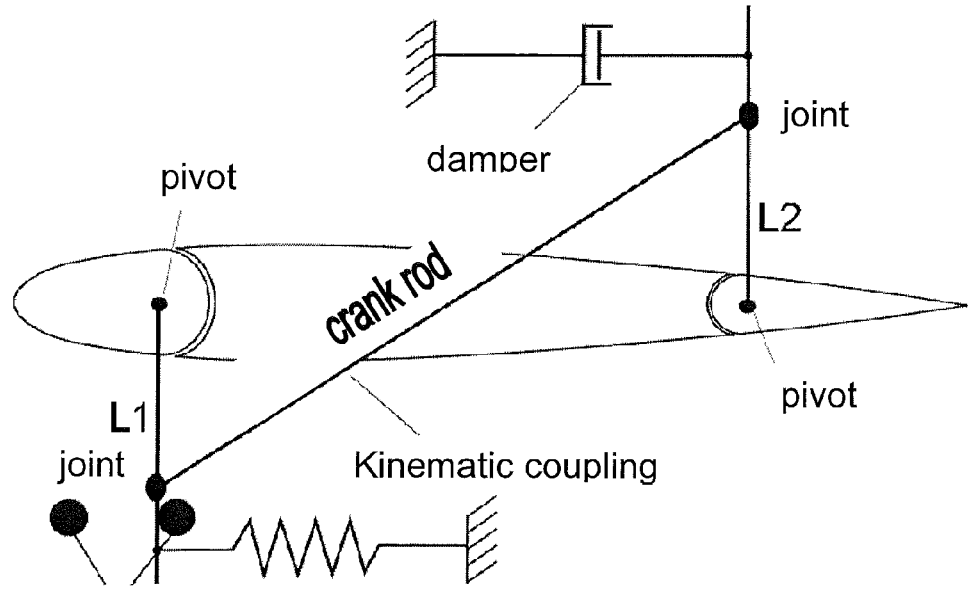
Fig. 1: Practical embodiment with crank rod and joints, with control horns of the length L1 and L2 firmly connected to a single flap each
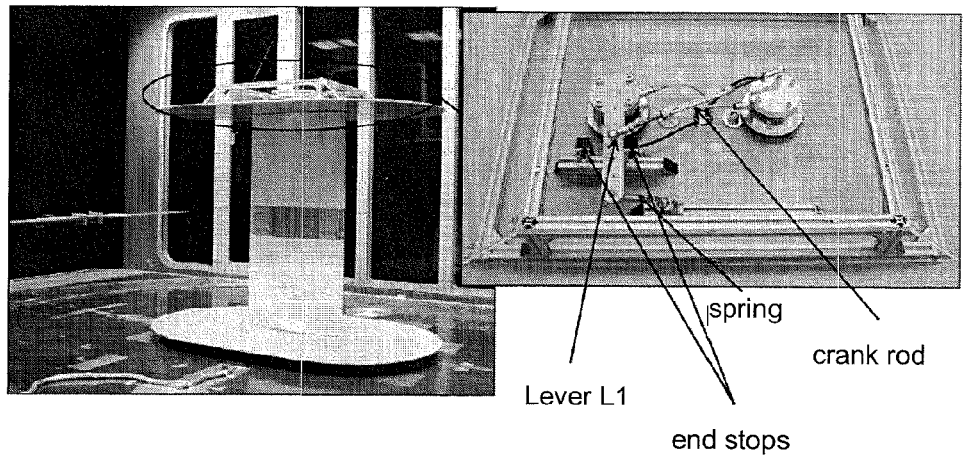
Fig. 2: Experimental setting Fig. 13a    Fig. 13b
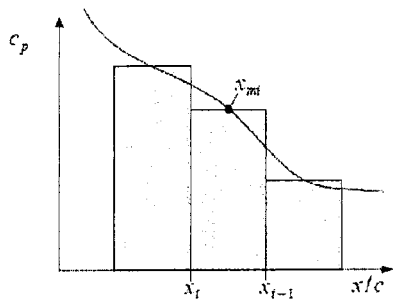
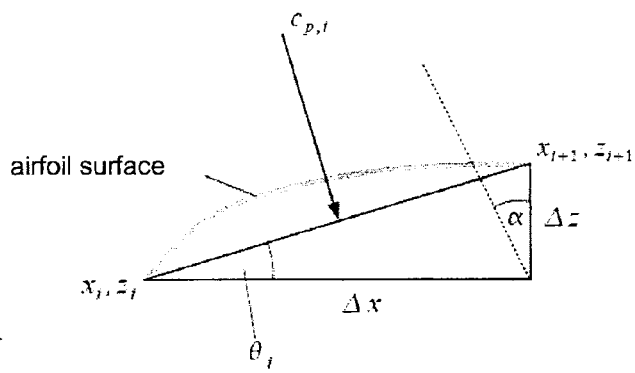
Fig. 14
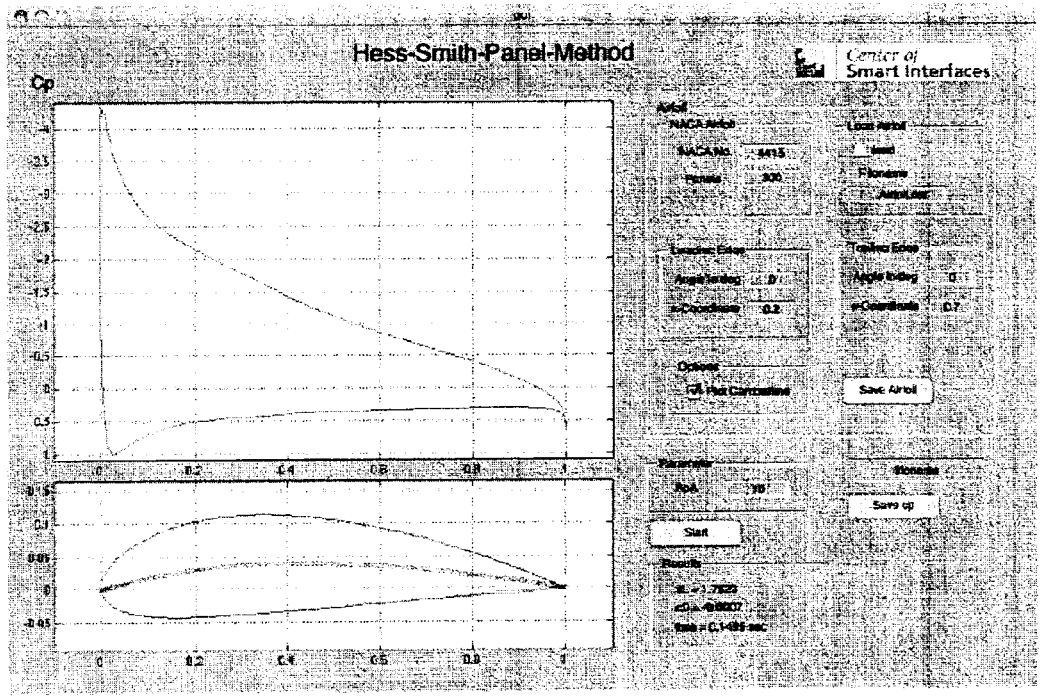

Fig. 17a
Fig. 17b
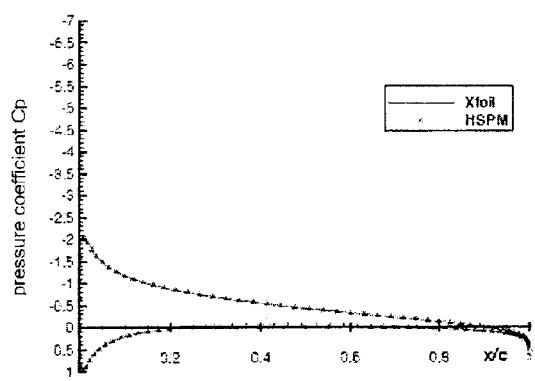
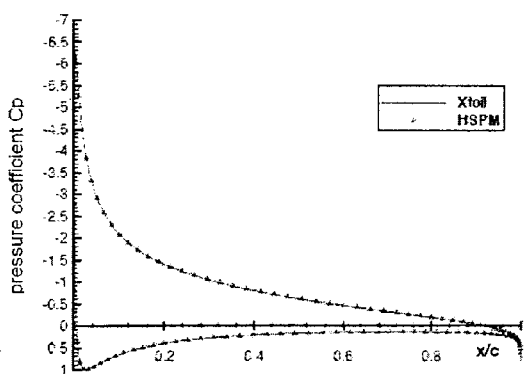

Fig. 19a
Fig. 19b
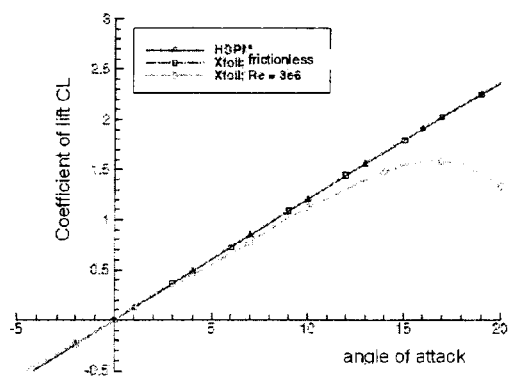
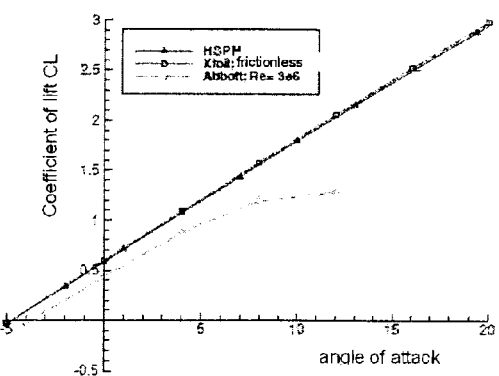
Fig. 20
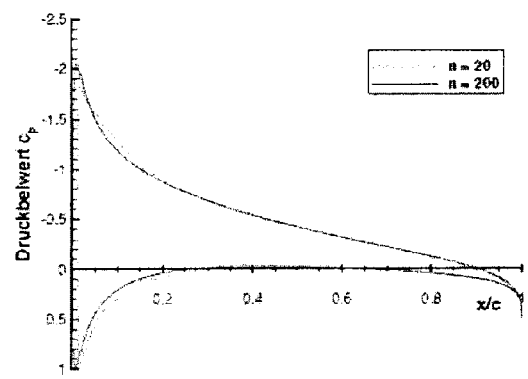

Fig. 21a
Fig. 21b
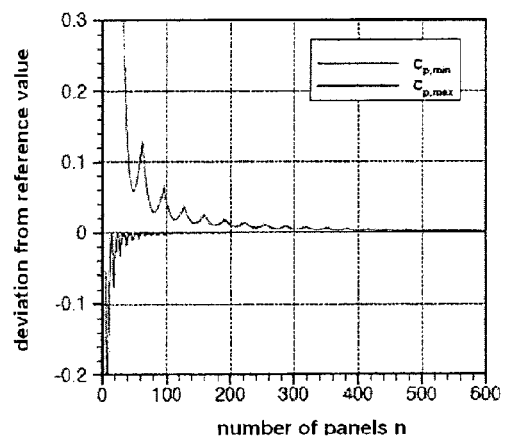
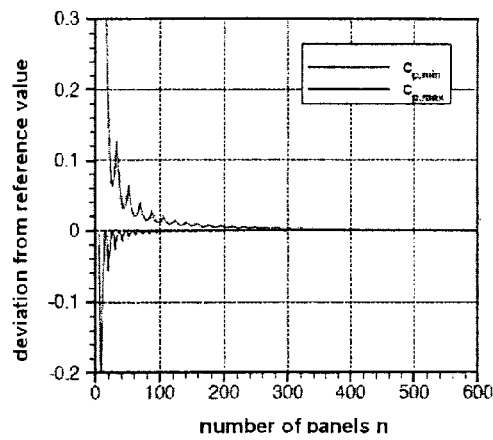
Fig. 22
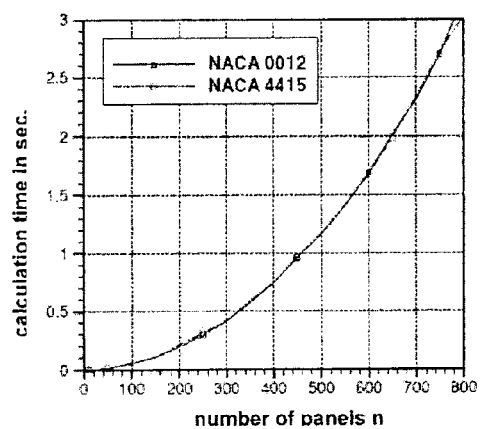

Fig. 42a
Fig. 42b
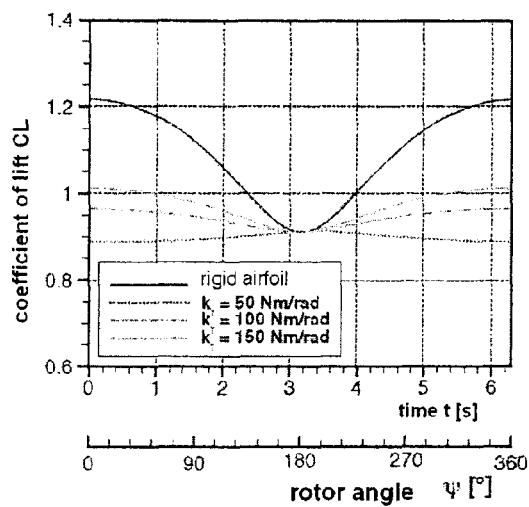
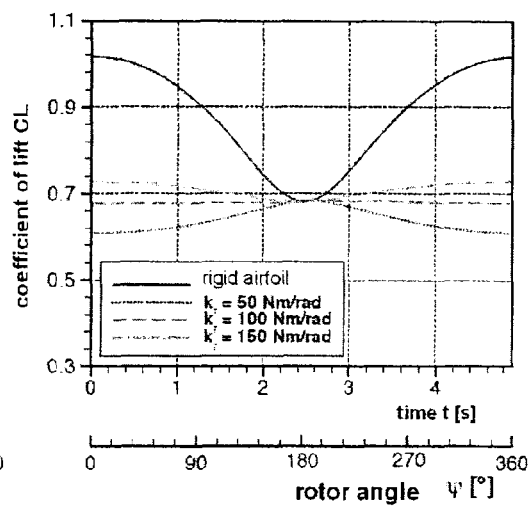

INVENTION RELATING TO ROTOR BLADES, IN PARTICULAR FOR WIND POWER INSTALLATIONS

FIELD OF THE INVENTION

The present invention relates to rotor blades, in particular for use in wind turbines and in particular to general research into the fluid-structure interaction of a concept for the passive reduction of gust loads on turbine generators. Rotor blades on turbine generators experience alternating loads which are attributable to fluctuations in the angle of attack and freestream. This causes constantly changing lifts. With the concept researched here, these changes are intended to be reduced.

STATE OF THE ART

The reciprocal effect of flows on an elastic structure leads to a deformation in structure which in turn changes the flow forces. This behavior is generally described as fluid-structure interaction (FSI). The description of this reciprocal effect to define the static and dynamic stability of the structure is of significant practical relevance in the field of aeroelastics, namely the interaction of air flows with elastic airfoils. Due to the deformation of the structure, aerodynamic forces are induced which discharge energy into the structure depending on the phase angle with regard to system movement.

With increasing velocity, a critical point is reached at which the energy input exceeds the dissipated energy via structure damping, thereby leading to fuelled vibrations. This phenomenon is known as flutter. While aeroelasticity, since its origins in the 1920s, has been defined as a scientific discipline by making models and theories available which facilitate a precise prediction of flutter limits, the attempt has increasingly been made in the last thirty years to use this reciprocal effect to the benefit of flow control. For the profitable use of fluid-structure interaction, however, this means determining the average temporal flow behavior and optimizing the structural stiffness, so that a target function is achieved more effectively on average whilst maintaining stability.

Wind turbine generators are subject to constantly changing loads. These load changes result from the traversal of the planetary boundary layer, fluctuations in wind speed due to turbulence and gusts of wind, the tower wake and vibrations of the rotor blade.

These effects cause a change in the angle of attack under which air flows against the airfoil, and thus a change in pressure along the airfoil. Under these operating conditions, the components of a wind turbine generator are placed under such stress that the twenty-year operating life is not reached for some parts of the turbine. With regard to the development of measures with which such load fluctuations are suitable to be controlled, it is necessary for these components to achieve the required level of reliability and for the complexity of the system to remain manageable.

SUMMARY OF THE INVENTION

Therefore, the aim of the present invention is to provide for an airfoil of rotor blades, in particular for use in WTGs, which overcomes the disadvantages of the state of the art.

BRIEF DESCRIPTION OF THE DRAWINGS

FIG. 1 is a schematic representation of a crank mechanism of the invention.

FIG. 2 is a photograph of an experimental setting using the crank mechanism of FIG. 1.

FIG. 13 is a graph showing a calculation of the coefficient of lift $c_L$—Center point rule.

FIG. 13 is a graph showing a calculation of the coefficient of lift $c_L$—Discretization of the geometry.

FIG. 14 is a screenshot of the GUI for the steady panel method.

FIG. 17a is a graph showing a comparison of Xfoil with HSPM for NACA 0012, number of panels n=300, $\alpha=5°$.

FIG. 17b is a graph showing a comparison of Xfoil with HSPM for NACA 0012, number of panels n=300, $\alpha=10°$.

FIG. 19a is a graph showing a course of the coefficient of lift $c_L$ dependent on $\alpha$, number of panels n=300, NACA 0012.

FIG. 19b is a graph showing a course of the coefficient of lift $c_L$ dependent on $\alpha$, number of panels n=300, NACA $64_3618$.

FIG. 20 is a graph showing a course of the pressure coefficients for different numbers of panels; NACA0012; $\alpha=10°$.

FIG. 21a is a graph showing a deviation from final value dependent on the number of panels, NACA 0012.

FIG. 21b is a graph showing a deviation from final value dependent on the number of panels, NACA 4415.

FIG. 22 is a graph a calculation time dependent on the number of panels.

FIGS. 31a and 30b are graphs of influence of damping $d_\beta$ on the coefficient of lift $c_L$; NACA $64_3618$; $V_\infty=60$ m/s; $\alpha(t)=5°+5° \sin(4t)$; $x_{ie}=0.2$; $x_{te}=0.7$; $k_\gamma=100$ Nm/rad; i=3.

FIG. 42a is a graph showing NREL; radial position RP=16; NACA $64_3618$; $x_{ie}=0.2$; $x_{te}=0.7$; $d_\beta=1$ Nms/rad; i=3; $V_{Wind}=8$ m/s.

FIG. 42b is a graph showing NREL; radial position RP=16; NACA $64_3618$; $x_{ie}=0.2$; $x_{te}=0.7$; $d_\beta=1$ Nms/rad; i=3; $V_{Wind}=12$ m/s.

DETAILED DESCRIPTION OF THE INVENTION

Figure 3:
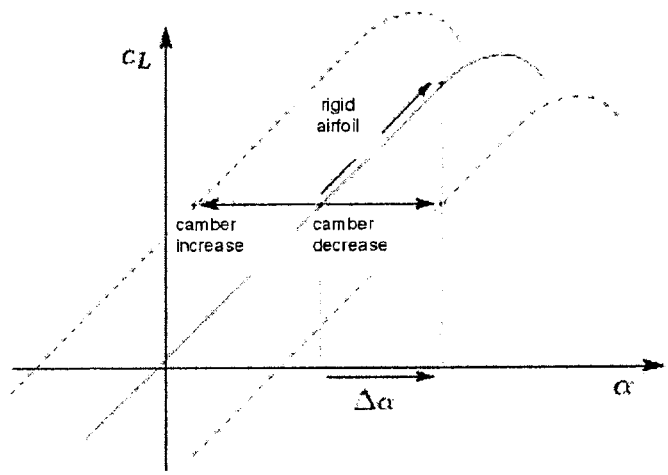
FIG. 3 is a graph showing parallel shift of the cL curve as a result of a change in the camber on the airfoil.

In this context, the present invention follows the approach of dampening pressure fluctuations on an airfoil resulting from a change in the angle of attack by means of a passive adjustment of the airfoil camber. The aim is keep the lift constant, i.e. the loads on the airfoil.

The invention intrinsic to the concept comprises a flap profile (profiling for the rotor blades) that achieves this reduction via a change in camber. The change in camber is thereby introduced by the flow itself.

The change in camber is thereby facilitated via an elastic and/or rotatably mounted flap system comprising leading edge and trailing edge flaps. Both flaps are thereby kinematically coupled to one another. The kinematics for the purpose of the rigid coupling is suitable to be carried out in various ways. In the simplest manifestation, it comprises a crank mechanism; however, all kinds of transmission system are conceivable to function as a means for producing the same kinematics. The crank mechanism is schematically illustrated in FIG. 1. Control horns of the lengths L1 and L2, which are firmly connected to a single flap each, are connected with the connecting rod L. The core principle of the arrangement is that one control horn is fitted at the top (bottom) and the other at the bottom (top), so that one flap rotates clockwise and the other flap simultaneously rotates anticlockwise.

Transmission ratios (L1/L2) from 2 to 3 produced optimum and satisfactory results both in theoretical calculations and in practice. The choice of this transmission ratio relates to the choice of spring stiffness. The transmission ratio defines the scale for the increase/decrease in lift with an increasing/decreasing angle of attack (increase in the function that specifies the coefficient of lift via the angle of attack).

In the case of a change in the flow's angle of attack, this predominantly leads to a change in pressure force in the nose area of the leading edge of the airfoil.

The force resulting from the change in pressure simultaneously controls the displacement amplitude of the flaps on the leading and trailing edges. This thereby facilitates an increase or decrease in camber.

The force resulting from the change in pressure produces a moment around the pivot of the elastic leading edge or trailing edge flap. This moment in turn leads to a rotary movement of the elastic leading edge or trailing edge flap which simultaneously twists the trailing edge flap via the crank mechanism. The displacement amplitudes of the elastic trailing edge or trailing edge flap are greater according to the ratio of L1/L2 than the elastic leading edge or leading edge flap. An increase or decrease in blade camber of the aerodynamic airfoil (airfoil cross section) is thereby achieved via the effect of the air forces on the elastic leading edge or leading edge flap.

It is known that the pressure difference arising between the upper and lower side in the front airfoil area is much greater than in the rear area due to the surrounding air flow of the airfoil. With a constant angle of attack, the pressure difference depends on the airfoil form. This fact defines the lengths of the elastic sides or the flaps. It has been proven that the length of the leading edge flap should amount to 15% to 20% of the chord, while the length of the trailing edge flap should amount to 20% to 30% of the chord.

It is important to note that the pressure difference between the upper and lower side of the airfoil also produces a force or moment on the elastic trailing edge or trailing edge flap. By means of the rigid connection between the two flaps and the fact that a transmission ratio of L1/L2 is suitable to be established, the trailing edge flap moments are increased by the ratio of L1/L2 and transferred via the pivot of the leading edge flap. That means that under certain pressure distributions, the flap mechanism is controlled by the trailing edge flaps. This circumstance is advantageous with regard to the stability of the system and is to be considered in the design.

The results show that the amplitudes are completely ! reduced for harmonic, regular changes in the angle of attack.

Wind turbine generators experience constantly changing loads due to their operating conditions. In particular, the fluctuating aerodynamic loads result in changing bending stresses at the root of the rotor blades. These alternating stresses reduce the fatigue strength of the blade. At the rotor blade, the largest forces occur in the outer area of the blade due to the high peripheral speeds. Furthermore, these forces are dependent on the coefficient of lift cL of the individual airfoil segments. The loads on the rotor blade are therefore suitable to be controlled via a change in the coefficient of lift. The coefficient of lift is, inter alia, dependent on the profile camber. The camber is suitable to be changed during operation via the use of flaps and leads to a parallel shift of the cL-α_curve, as is illustrated in FIG. 3.

On wind turbine generators, the angle of attack α results from the vectorial sum of peripheral speed and wind speed with the airfoil. As a result of this, fluctuating wind speeds cause a change in the angle of attack.

Figure 4:
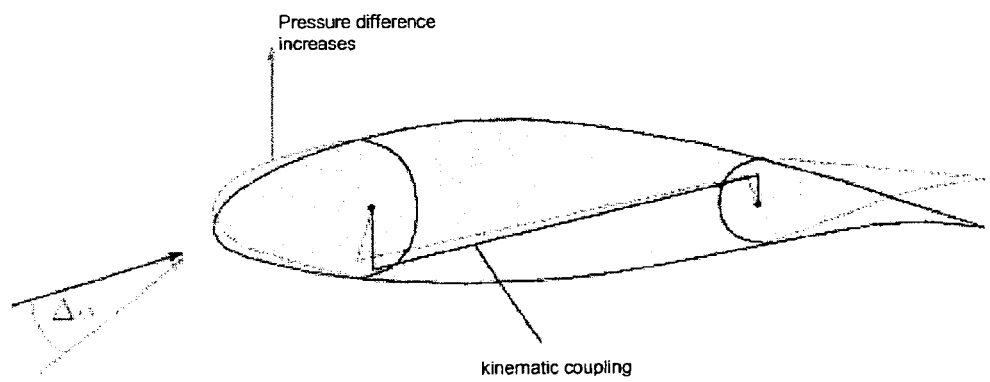
FIG. 4 shows a schematic of the concept of the flap airfoil for the purpose of load reduction and decrease in camber.

In the concept underlying the invention, the invention utilizes this change in the angle of attack to cause a passive change in camber. An increase in the angle of attack results in a higher maximum level of suction in the leading edge area of the airfoil. This increase in pressure deflects a leading edge flap on the airfoil, as indicated in FIG. 4.

A spring attached to the crank handle of the elastic leading edge or the leading edge flap facilitates the setting of the system's operating range by overlaying the preload force of the spring on the flow forces acting on the leading edge. The ratio of the preload force to the rotation angle is suitable to be defined by choosing the spring stiffness.

The choice of spring stiffness is connected with the choice of the transmission ratio. The spring stiffness defines the scale for the increase/decrease in lift with an increasing/decreasing angle of attack (increase in the function that specifies the coefficient of lift via the angle of attack).

The preload force or the preload moment depends on the design point selected. The higher the preload moment, the higher the lift in the design point becomes.

As this is an system capable of oscillations, a damper is attached to the trailing edge's crank handle which stabilizes the system.

The rotary movement is suitable to be limited to certain angles via mechanical end stops on the elastic sides or the flaps, thereby also limiting the system's operating range. Operating range refers to the range in which the airfoil remains elastic or increases or decreases in camber. If the elastic sides or flaps touch the end stops, the airfoil acts like a rigid airfoil, i.e. the lift increases or decreases with a further elevation or reduction of the angle of attack depending on the airfoil contour which has subsequently been set.

A kinematic coupling of this deflection with the trailing edge flap leads to a decrease in camber of the airfoil. The resulting overloads are thereby attenuated, which reduces the tension amplitudes. A spring attached to the leading edge flap provides the restoring force (cf. FIG. 5 and FIG. 1). Furthermore, a corresponding prestress of the spring allows an increase in camber of the airfoil. As a result of this, fluctuating loads are suitable to be held constant around a design point. As it is a system capable of oscillations, a damper is attached to the trailing edge.

The kinematic coupling is hereby suitable to occur in any form known to persons skilled in the art, possible ways of kinematic coupling are any type of gears, e.g. joints, spur gears, bevel gears, planetary gears, worm gears, friction gears, screw gears, wedge gear, chain drives, toothed belt gear, flat belt gear, wedge belt drive, crank drives, toggle joint gears, lever gears.

The following elements are suitable as springs: torsion spring, tension spring, compression spring, disk spring, compressed air actuators. In particular, the use of spring elements with non-linear characteristic spring curve may be considered.

The following known dampers are suitable as dampers: oil dampers, air dampers, viscous dampers.

Figure 6:
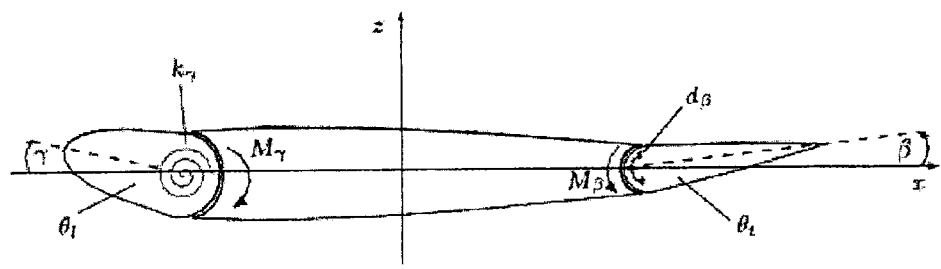
FIG. 6 shows a schematic of a flap model with a degree of freedom.

The structural behavior is described via an equation of motion. The equation of motion is suitable to be derived via the substitute model shown in FIG. 6.

The ordinate of the rectangular coordinate system is situated on the chord line, and the origin is located at half of the chord (c/2). The rotation angle g describes the deflection of the leading edge flap, and the rotation angle b describes the deflection of the trailing edge flap. Correspondingly, the moments of inertia are identified as $\theta_l$ (l=leading) and $\theta_t$ (t=trailing) and are defined around the flap edge pivots. The restoring force of the leading edge flap results from the torsional stiffness $k_\gamma$ and the deflection y. The damping $d\beta\_$ is taken into consideration at the rear edge flap via the angle speed β-point. The coupling of the two flaps takes place via the transmission ratio:

$$i = \frac{\beta}{\gamma} = \frac{\dot\beta}{\dot\gamma}. \tag{2.68}$$

The degree of freedom β is therefore a function of γ. The linear equation of motion is thus:

$$\theta_K \ddot\gamma + d_\beta i \dot\gamma + k_\gamma \gamma = M_\gamma(t) + M_\beta(t). \tag{2.69}$$

wherein $\theta_K$ is the total moment of inertia of both flaps:

$$\theta_K = \theta_l + \theta_t i^2. \tag{2.70}$$

The aerodynamic moments $M_\gamma(t)$ and $M_\beta(t)$ are defined by the moment coefficients:

$$M_\gamma(t)+M_\beta(t)=(c_{M_{LE}}+c_{M_{TE}})\tfrac{1}{2}\rho v_\infty^2 c^2 b. \quad (2.71)$$

In a (not shown) embodiment, the use of an integrated, resilient structure is provided in place of the use of flaps. As a material, rubber, latex, fibre plastic compounds and/or intelligent materials are considered, e.g. SMA or piezo-electric materials. The coupling subsequently takes place via an integrated flux of force through the structure from front to back. Damping elements as described above should subsequently be used as a means of stabilization.

As an alternative (not shown), the use of active dampers and stiffness elements is possible.

As an alternative (not shown), the coupling is also suitable to be actively adjusted via the use of principles/gear types as mentioned above.

Figure 5:
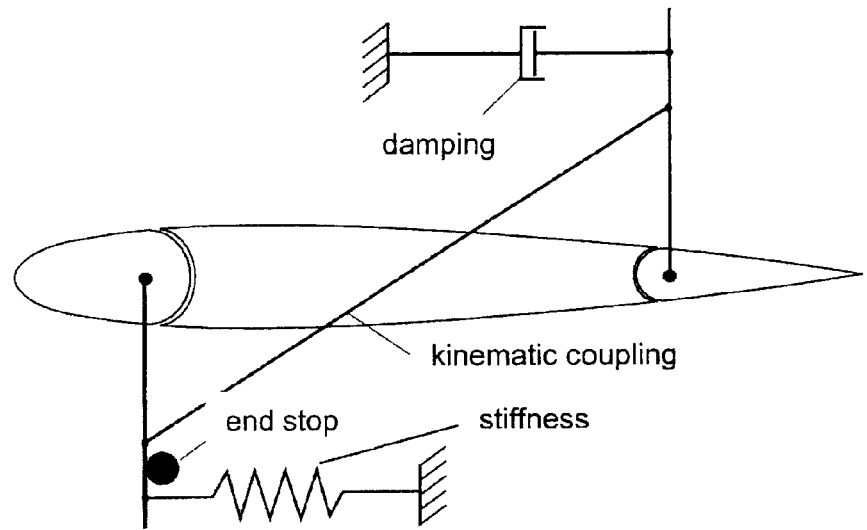
FIG. 5 shows a schematic of a concept of the flap airfoil with restorative spring, damping and end stop.

In other embodiments (not shown) in modifications to FIG. 5 and FIG. 1, the attack points for the elements coupling, damping and stop are respectively situated on various areas of the flaps, which are also suitable to be located outside the axis ranges for the bearing of the deflectable flaps.

[List of reference numerals]

Latin characters

| | | |
|---|---|---|
| A | [-] | Influence coefficients of the source distribution |
| B | [-] | Influence coefficients of the vortex distribution |
| b | [m] | Wing span |
| C | [-] | Influence coefficients of the discrete vortex in the wake |
| c | [m] | Chord |
| $c_L$ | [-] | Coefficient of lift |
| $c_M$ | [-] | Moment coefficient |
| $c_P$ | [-] | Pressure coefficient |
| D | [-] | Influence coefficient of the shed vortex |
| i | [-] | Transmission ratio |
| k | [-] | Reduced frequency |
| $k_\gamma$ | $\left[\frac{Nm}{rad}\right]$ | Spring constant |
| l | [-] | Panel length |
| $M_\gamma$ | [Nm] | Moment on the leading edge |
| $M_\beta$ | [Nm] | Moment on the trailing edge |
| n | [-] | Panel number |
| V | $\left[\frac{m}{s}\right]$ | Velocity |
| $V_\infty$ | $\left[\frac{m}{s}\right]$ | Freestream velocity |
| $V_{Stream}$ | $\left[\frac{m}{s}\right]$ | Velocity relative to airfoil |
| r | [-] | Distance |
| T | [J] | Kinetic energy |
| t | [s] | Time |
| U | [J] | Potential energy |
| u | $\left[\frac{m}{s}\right]$ | Velocity component in x-direction |
| w | $\left[\frac{m}{s}\right]$ | Velocity component in z-direction |

Greek characters

| | | |
|---|---|---|
| α | [°] | Angle of attack |
| β | [°] | Trailing edge flap angle |
| Γ | $\left[\frac{m^2}{s}\right]$ | Circulation |
| γ | [°] | Leading edge flap angle |
| ρ | $\left[\frac{kg}{m^3}\right]$ | Air density (=1.204) |
| Φ | $\left[\frac{m^2}{s}\right]$ | Velocity potential |
| Ψ | [°] | Rotor angle |
| ∇ | [-] | Nabla operator |
| σ | $\left[\frac{m}{s}\right]$ | Source |
| τ | $\left[\frac{m}{s}\right]$ | Vortex strength |
| $\theta_i$ | [rad] | Panel angle |
| $\theta_l$ | [kgm²] | Leading edge moment of inertia |
| $\theta_t$ | [kgm²] | Trailing edge moment of inertia |
| ω | $\left[\frac{1}{rad}\right]$ | Angular velocity |

Indices
Subscripts

| | |
|---|---|
| 0 | Initial value |
| i | Panel |
| j | Source/vortex |
| k | Time step |
| le | Leading edge |
| kl | Flaps coordinates |
| mi | Control point |
| m | Vortex in wake |
| p | Panel coordinates |
| s | Shed vortex on the trailing edge |
| St | Stagnation point |
| st | Steady |
| te | Trailing edge |
| w | Vortex |

Superscripts

| | |
|---|---|
| n | Direction of the normal |
| t | Tangential direction |
| x | x-direction |
| z | z-direction |

In another (not shown) embodiment, it is provided that the calibration of damping and/or the strength of the cinematic coupling and/or the calibration of stiffness in the present invention are implemented in an alterable manner via corresponding methods depending on the wind or (in case of application beyond a WTG) depending on the operating conditions in fixed or variable time intervals for fixed or variable time intervals which are controlled or regulated in a variable manner.

Furthermore, in this case the mode of operation for the rotor profile continues to be passively coupled. Only the type of coupling or damping or stiffness is implemented in a variable manner. After respectively calibrating the new parameters, the coupling between the leading edge and trailing edge of the airfoil occurs again in a passive manner.

The flow model method used for this will be shown in the following.

The panel method according to Hess and Smith (1966) is hereby used. Furthermore, unsteady vortex separations are suitable to be considered by means of the time-dependent discretization of the wake. The structure is illustrated using a discrete substitute model and is described via a linear equation of motion.

Panel methods are based on Laplace's equation. In the following, this equation is derived using the principle of conservation of mass and in consideration of the potential theory. The flow is thereby considered to be incompressible and frictionless.

In a limited volume element within the flow area, the masses must remain temporally constant. The conservation of mass is described via the continuity equation:

$$\frac{\delta \rho}{\delta t} + \nabla \cdot (\rho V) = 0 \tag{2.1}$$

wherein $\rho$ is the density and V is the speed. If an incompressible fluid is considered, $\rho$=const., 2.1 subsequently reduces to $$\nabla \cdot V = 0. \tag{2.2}$$

In a flow area, a velocity vector is suitable to be allocated to every point. From a mathematical point of view, this is a vector field. If this vectorial flow area has a potential, this is referred to as potential flow. According to the definition of the potential, the flow region is free of vortex at every point, i.e. the rotation disappears:

$$\nabla \times V = 0. \tag{2.3}$$

The gradient of the potential produces the velocity field $$\nabla \Phi = V. \tag{2.4}$$

Laplace's equation results from the equation 2.2 and 2.4 for the description of an incompressible potential flow $$\nabla^2 \Phi = 0. \tag{2.5}$$

This equation is a linear differential equation. This means its solution is suitable to be constructed from the superposition of several individual solutions. In terms of fluid mechanics, this results from the overlapping of elementary flows. The parallel flow, the sources and sinks, dipole and irrotational vortex, which are described in the relevant literature such as Durst (2006), are part of the elementary flows.

Figure 7:
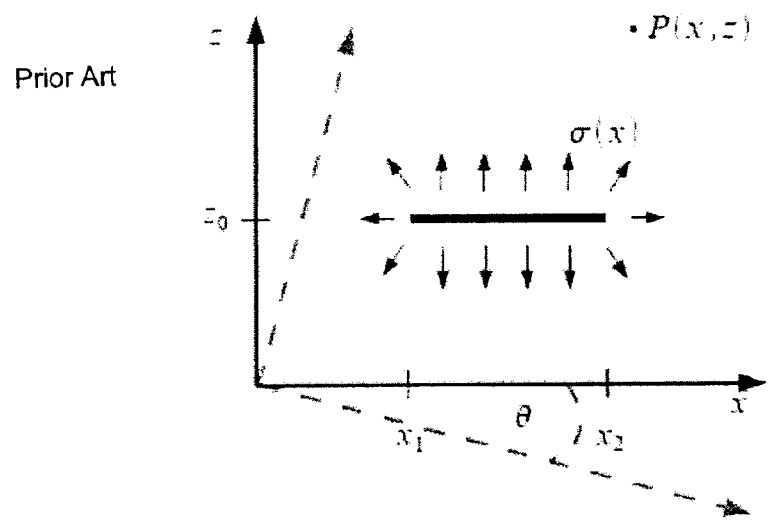
FIG. 7 shows a planar source and distribution and panel coordinates.

In the present work, the flow surrounding the airfoil is identified from an overlapping of sources and vortices with the free freestream. The airfoil surface is hereby initially divided into discrete segments, so-called panels. On these panels, the sources and vortices are distributed in such a way that they fulfill the kinematic boundary condition and the Kutta condition. The panel method used in this work has the characteristic that the amount of sources and vortices are constant over a panel, as shown in FIG. 7. According to Katz and Plotkin (2001), the velocity induced by the panel is derived as follows. The panel is demarcated by the points $x_1$ und $x_2$ and is inclined around the angle $\theta$ with regard to the x axis.

It is displayed according to panel coordinates, so that the panel is parallel to the x axis. A source only induces velocities in a radial direction, which depend on the yield and distance to the source. In case the degree of yield is constant, the following applies: $\sigma(x) = \sigma = $ const. The influence of the velocity potential $\Phi$ of a source element $dx_0$ on an arbitrary point $P(x,z)$ is provided by $$d\Phi(x, z) = \frac{\sigma}{2\pi} \cdot \ln\sqrt{(x-x_0)^2 + (z-z_0)^2} \cdot dx_0. \tag{2.6}$$

As this is a potential, only the differentials $$\frac{\delta}{\delta x} \text{ and } \frac{\delta}{\delta z}$$

have to be considered.

When integrated across the entire panel from $x_1$ und $x_2$, the following velocity components are obtained in the x- and z-direction:

$$u_p(x, z) = \frac{\sigma}{2\pi} \int_{x_1}^{x_2} \frac{x-x_0}{(x-x_0)^2 + (z-z_0)^2} dx_0 \tag{2.7}$$

$$w_p(x, z) = \frac{\sigma}{2\pi} \int_{x_1}^{x_2} \frac{z-z_0}{(x-x_0)^2 + (z-z_0)^2} dx_0 \tag{2.8}$$

wherein the index p stands for panel coordinates. According to Katz and Plotkin (2001), the solution of the integral from 2.7 and 2.8 is provided via $$u_p(x, z) = \frac{\sigma}{2\pi} \ln \frac{\sqrt{(x-x_1)^2 + (z-z_1)^2}}{\sqrt{(x-x_2)^2 + (z-z_2)^2}} \tag{2.9}$$

$$w_p(x, z) = \frac{\sigma}{2\pi} \left[ \arctan \frac{z-z_2}{x-x_2} - \arctan \frac{z-z_1}{x-x_1} \right]. \tag{2.10}$$

As the panel is parallel to the x axis, $z_1 = z_2$ applies.

Of particular interest is the case in which the considered point P is located in the middle of the panel. In general, one initially obtains for the points on the panel with $z = z_1 = z_2$:

$$u_p(x, z_1) = \frac{\sigma}{2\pi} \ln \frac{x-x_1}{|x-x_2|} \tag{2.11}$$

$$w_p(x, z_1) = \frac{\sigma}{2}. \tag{2.12}$$

Furthermore, the velocity $$u_p(x_M, z_1) = \frac{\sigma}{2\pi} \cdot \ln(1) = 0. \tag{2.13}$$

results for the middle of the panel with the coordinates $$x_M = \frac{x_1 + x_2}{2}.$$

In contrast to sources, vortices only induce velocities in the tangential direction. An analogue derivation represented above produces the velocity components in an x and z direction for a constant vortex distribution across the panel with the vortex strength $\tau$ $$u_p = \frac{\tau}{2\pi} \cdot \left[\arctan\frac{z-z_2}{x-x_2} - \arctan\frac{z-z_1}{x-x_1}\right] \qquad (2.14)$$

$$w_p = \frac{\tau}{2\pi} \cdot \ln\frac{\sqrt{(x-x_1)^2+(z-z_1)^2}}{\sqrt{(x-x_2)^2+(z-z_2)^2}} \qquad (2.15)$$

and, for a point in the middle of the panel with z=0 and $$x = \frac{x_1+x_2}{2},$$

the velocity $$u_p = \frac{\tau}{2} \qquad (2.16)$$

$$w_p = 0. \qquad (2.17)$$

Figure 8:
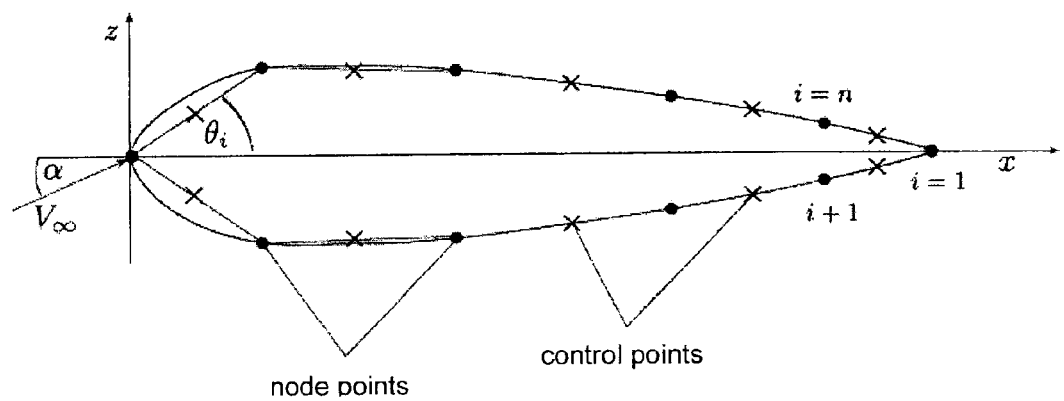
FIG. 8 shows a schematic of a distribution of node and control points under guidance from the prior art of Cebeci et al. (2005)

The panel method used in this work goes back to Hess and Smith (1966) and follows the representation of Cebeci et al. (2005). The airfoil geometry is discretized via n panels which are respectively demarcated by two nodes; see FIG. 8. The distribution of the total n+1 nodes occurs via a cosine transformation so that a higher resolution occurs on the leading and trailing edges. This guarantees a significantly more accurate approximation of the airfoil contour while the number of panels remains the same. Areas with small gradients are suitable to be discretized with larger panels without leading to a loss in accuracy. This thereby guarantees an efficient discretization with regard to calculation.

The following applies for the cosine transformation wherein β is uniformly divided into n+1 steps. The coordinates are counted starting $$x = \tfrac{1}{2}(1-\cos\beta) \qquad (2.18)$$

from the trailing edge. They run along the underside of the airfoil to the leading edge and back over the upper side. With regard to the x axis, every panel has an inclination which is established via the angle $\theta_i$.

$$\theta_i = \arctan\left(\frac{z_{i+1}-z_i}{x_{i+1}-x_i}\right), \qquad (2.19)$$
$$i=1,2,\ldots n$$

The calculation of the flow is carried out via the overlapping of sources and vortices with the free freestream. The velocity at an arbitrary point P(x, z) is given via $$\vec{V} = \vec{U}_\infty + \vec{v} \qquad (2.20)$$

wherein $\vec{V}_\infty$ is the undisturbed freestream $$\vec{U}_\infty = V_\infty \cdot (\cos\alpha \cdot \vec{e}_x + \sin\alpha \cdot \vec{e}_z) \qquad (2.21)$$

and $\vec{v}$ is the velocity induced by the sources and vortices. In order to clearly define the flow, two boundary conditions have to be fulfilled. As the airfoil is not suitable to be run through, the kinematic boundary condition $$V_i^n = 0, i=1,2,\ldots,n \qquad (2.22)$$

has to be met at every panel. As a result, the airfoil surface will become a streamline. The condition is met at n control points, which are respectively located in the middle of the panel:

$$x_{mi} = \tfrac{1}{2}(x_i + x_{i+1}) \qquad (2.23)$$

$$z_{mi} = \tfrac{1}{2}(z_i + z_{i+1}) \qquad (2.24)$$

For this, the influence of the sources and vortex elements of each panel has to be determined. For the control point number i/the i-st control point, the velocity components in normal and tangential direction result in $$V_i^n = \sum_{j=1}^n A_{ij}^n \sigma_j + \sum_{j=1}^n B_{ij}^n \tau_j + V_\infty \sin(\alpha - \theta_i) \qquad (2.25)$$

$$V_i^t = \sum_{j=1}^n A_{ij}^t \sigma_j + \sum_{j=1}^n B_{ij}^t \tau_j + V_\infty \cos(\alpha - \theta_i) \qquad (2.26)$$

via summation.

j is the index for the panels. $A_{ij}^n$, $A_{ij}^t$, $B_{ij}^n$ und $B_{ij}^t$ are the matrices of the coefficients of influence. The superscript indices n and t stand for the normal and tangential direction. Together with $\sigma_j$ und $\tau_j$, the coefficient matrices result in/correspond to the velocities which are induced by the panel number j at the control point number i. $\sigma_j$ is the productivity of the constant source distribution on the number j and $\tau_j$ is the vortex strength, wherein ($\tau_j = \tau =$ const.) still applies. With equation 2.9, 2.10, 2.14 and 2.15, the following applies for the matrices:

$$A_{ij}^n = \begin{cases} \frac{1}{2\pi}\left[\sin(\theta_i-\theta_j)\ln\frac{r_{i,j+1}}{r_{i,j}} + \cos(\theta_i-\theta_j)\beta_{i,j}\right] & i \neq j \\ \frac{1}{2} & i = j \end{cases} \qquad (2.27)$$

$$A_{ij}^t = \begin{cases} \frac{1}{2\pi}\left[\sin(\theta_i-\theta_j)\beta_{i,j} - \cos(\theta_i-\theta_j)\ln\frac{r_{i,j+1}}{r_{i,j}}\right] & i \neq j \\ 0 & i = j \end{cases} \qquad (2.28)$$

$$B_{ij}^n = -A_{ij}^t \qquad (2.29)$$

$$B_{ij}^t = A_{ij}^n \qquad (2.30)$$

$$(2.31)$$

with the distance r and the angle β provided by $$r_{i,j+1} = \sqrt{(x_{mi}-x_{j+1})^2 + (z_{mi}-z_{j+1})^2} \qquad (2.32)$$

$$r_{i,j} = \sqrt{(x_{mi}-x_j)^2 + (z_{mi}-z_j)^2} \qquad (2.33)$$

$$\beta_{i,j} = \arctan\left(\frac{z_{mi}-z_{j+1}}{x_{mi}-x_{j+1}}\right) - \arctan\left(\frac{z_{mi}-z_j}{x_{mi}-x_j}\right) \qquad (2.34)$$

The second boundary condition that has to be met is the Kutta condition. This provides that the velocity requires a finite value on the trailing edge. The flow on the upper side and underside of the trailing edge achieves the same velocity at the first and last panel according to amount. As the velocities of the normal are zero, it is enough to meet the condition via the tangential components $$V_n^t = -V_1^t \qquad (2.35)$$

With these two boundary conditions, a linear equation system of the form $$A\vec{x} = \vec{b} \qquad (2.36)$$

is suitable to be formulated. This is where matrix A contains the coefficients of influence; the vector $\vec{x}$ contains the sources and vortex searched for, and the velocities of the free freestream are noted in vector $\vec{b}$. A is a quadratic matrix of the order n+1 and takes the form $$A = \begin{vmatrix} a_{11} & a_{12} & \cdots & a_{1n} & a_{1,n+1} \\ a_{21} & a_{22} & \cdots & a_{2n} & a_{2,n+1} \\ \vdots & \vdots & \ddots & \vdots & \vdots \\ a_{n1} & a_{n2} & \cdots & a_{nn} & a_{n,n+1} \\ a_{n+1,1} & a_{n+1,2} & \cdots & a_{n+1,n} & a_{n+1,n+1} \end{vmatrix} \quad (2.37)$$

The elements of matrix A are $$a_{ij} = A_{ij}^n \quad (2.38)$$

$$a_{i,n1} = \sum_{j=1}^{n} B_{ij}^n \quad (2.39)$$

The final row (n+1) results from the Kutta condition, for which the following applies:

$$\sum_{j=1}^{n}(A_{1j}^t + A_{nj}^t) \cdot \sigma_j + \tau \sum_{j=1}^{n}(B_{1j}^t + B_{nj}^t) = \quad (2.40)$$

$$-V_\infty \cos(\alpha - \theta_1) - V_\infty \cos(\alpha - \theta_n)$$

The coefficients for the final row of matrix A are thereby as follows:

$$a_{n+1,j} = A_{1j}^t + A_{nj}^t \quad (2.41)$$

$$a_{n+1,n+1} = \sum_{j=1}^{n}(B_{1j}^t + B_{nj}^t). \quad (2.42)$$

The unknown sizes $\sigma_j$ and $\tau$ are stored in vector $\vec{x}$ $$\vec{x} = (\sigma_1, \sigma_2, \ldots, \sigma_j, \tau)^T \quad (2.43)$$

The solution vector $\vec{b}$ contains the known velocities from the undisturbed freestream $$b_i = -V_\infty \sin(\alpha - \theta i) \quad (2.44)$$

$$b_{n+1} = -V_\infty \cos(\alpha - \theta_1) - V_\infty \cos(\alpha - \theta n) \quad (2.45)$$

By solving the equation system, the strengths of the sources and vortex are suitable to be determined.

For incompressible flow, the pressure coefficient is only dependent on the velocity. According to Bernoulli, the following applies:

$$c_{p,i} = 1.0 - \left(\frac{V_i^t}{V_\infty}\right)^2. \quad (2.46)$$

The airfoil geometry is once again modeled via a constant distribution of sources and vortices according to the unsteady panel method. For unsteady flow states, the unknown entities are time-dependent and are therefore indicated by the subscript index k in the following. One solution $(\sigma_j)_k$ and $\tau_k$ belong to every discrete time step $t_k$(k=0, 1, 2 . . . ), wherein j is the index of the panel once again.

Figure 9:
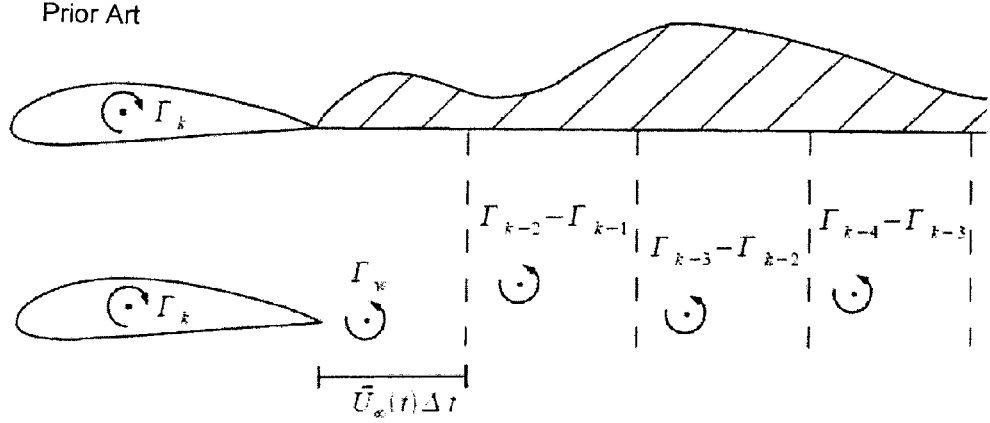
FIG. 9 illustrates a prior art discretization of the wake according to Katz and Plotkin (2001)

As a consequence of the dependence of the sources and vortices on time, the total circulation $\Gamma_k$ around the airfoil is also time-dependent. According to Kelvin and Helmholtz, the total circulation has always to be sustained, which is why a wake forms behind the airfoil. This wake comprises a continuous vortex filament which in total has the opposite amount of circulation around the airfoil. By means of the time discretization stated above, the wake is modeled via free, discrete vortices; see FIG. 9. The position and strength of the vortices was additionally calculated in previous time steps up to the flow time step in the vortex provided in the wake.

Cebeci et al. (2005) suggests representing this vortex via a panel on the trailing edge in order to fulfill the continuity of the wake. The vortex strength is also intended to be constant over the panel. In addition to the vortex strength, two other unknown entities hereby occur, namely the length of the panel and its position in relation to the x axis. An iterative method is necessary for its solution, which is why such a form of implementation is dispensed with to the benefit of the calculation time. Instead, the modeling occurs via a point singularity in the form of a discrete vortex. The vortex strength $\Gamma_w$ alone is added as an unknown entity. According to Kelvin and Helmholtz, the vortex strength $\Gamma_w$ results from the change in total circulation of the flow time step to the previous one:

$$\Gamma_w = \Gamma_{k-1} - \Gamma_k. \quad (2.47)$$

As the panels forming the wake are not occupied with continuous vortices, this produces a discretization error. In order to minimize this error, Katz and Plotik (2001) suggest placing the discrete vortex between 20% and 30% of the panel length. The present work uses the position $0, 25 U_\infty \Delta t$. For the calculation of the tangential $(V_i^t)_k$ and normal velocities $(V_i^n)_k$ at the control points, the equations 2.25 and 2.26 are expanded via the influence of the wake and the airfoil movement:

$$(V_i^n)_k = \sum_{j=1}^{n}(A_{ij}^n)_k(\sigma_j)_k + \tau_k \sum_{j=1}^{n}(B_{ij}^n)_k + \quad (2.48)$$

$$\sum_{m=1}^{k-1}(C_{i,m}^n)_k(\Gamma_{m-1} - \Gamma_m) + (D_i^n)_k \Gamma_w + V_{Stream}^n$$

$$(V_i^t)_k = \sum_{j=1}^{n}(A_{ij}^t)_k(\sigma_j)_k + \tau_k \sum_{j=1}^{n}(B_{ij}^t)_k + \quad (2.49)$$

$$\sum_{m=1}^{k-1}(C_{i,m}^t)_k(\Gamma_{m-1} - \Gamma_m) + (D_i^t)_k \Gamma_w + V_{Stream}^t$$

$V_{Stream}$ consists of the undisturbed freestream and the kinematic velocity of the control point i. This is defined by the airfoil and flap movement. The mathematical implementation is elaborated upon in chapter 3.

Figure 10:
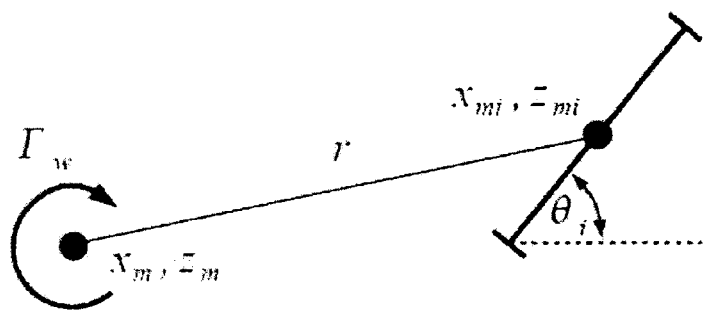
FIG. 10 illustrates an Induced velocity of a free vortex on control point.

As in the steady case, the coefficients of influence $(A_{ij}^n)$, $(A_{ij}^t)_k$, $(B_{ij}^n)_k$ and $(B_{ij}^t)_k$ are calculated with the equations 2.27, 2.28 and 2.29. The discrete vortices of the wake as shown in FIG. 10 induce the velocity at the control points $$V_\theta = -\frac{\Gamma}{2\pi r}$$

The index $\theta$ points out that a vortex only induces velocities in a vertical direction to r. At the control point i, the following results for the coefficients of influence $(D_i^n)_k$ and $(D_i^t)_k$ $$(D_i^n)_k = -\frac{z_s - z_{mi}}{2\pi r^2}\cos\theta_i \tag{2.50}$$

$$(D_i^t)_k = \frac{x_s - x_{mi}}{2\pi r^2}\sin\theta_i \tag{2.51}$$

wherein $(x_s, z_s)$ are the coordinates of the vortex directly on the trailing edge. If, in these two equations, the index s is replaced with m for the free vortices in the wake, the coefficients of friction $(C_{i,m}^n)_k$ and $(C_{i,m}^t)_k$ are obtained:

$$(C_{i,m}^n)_k = -\frac{z_m - z_{mi}}{2\pi r^2}\cos\theta_i \tag{2.52}$$

$$(C_{i,m}^t)_k = \frac{x_m - x_{mi}}{2\pi r^2}\sin\theta_i \tag{2.53}$$

For rates of change of the angle of attack or flap angle which are too large, the Kutta condition is possibly no longer suitable to be fulfilled. In this case, an applied flow is no longer available. The equation for the unsteady Kutta condition is obtained from the Bernoulli equation for unsteady flows:

$$(V_1^t)_k^2 - (V_n^t)_k^2 = 2\left[\frac{\delta(\Phi_n - \Phi_1)}{\delta t}\right]_k = 2\left(\frac{\delta\Gamma}{\delta t}\right)_k. \tag{2.54}$$

$\Phi_i$ is the velocity potential at the i-st control point. If only the steady case is considered, the right-hand side of this equation becomes zero and the presentation of the Kutta condition stated above is obtained once again. The time derivative of the circulation is suitable to be approximated using finite differences. The equation 2.54 thereby becomes $$(V_1^t)_k^2 - (V_n^t)_k^2 = 2l\frac{\tau_k - \tau_{k-1}}{t_k - t_{k-1}} \tag{2.55}$$

wherein l is the circumference of the airfoil.

Using the reduced frequency $$k = \frac{\omega c}{2V_\infty} \tag{2.56}$$

the degree to which the flow is unsteady is suitable to be estimated. Therefore, a statement about when the Kutta condition loses its validity becomes possible. In equation 2.5, ω is the angular frequency with which the airfoil moves in the flow. A unsteady example is the wake on the trailing edge treated in this panel method, which materializes due to flap deflections and changes in the angle of attack. Leishman (2006) states that the flow for a reduced frequency of k=0 is suitable to be considered as steady. From k=0 to k=0.05, calculations are suitable to be made in a quasi-steady manner. In this case, the forces from the unsteady effects are negligible in comparison to the steady effects. However, with increasing frequency, these effects increase in significance and have to be factored into the flow analysis. If the frequencies become too high, this may lead to flow separation. The Kutta condition does not provide any suitable boundary conditions for such cases. For the validity of the Kutta condition, Katz and Plotkin (2001) state an upper limit of 1.0 for the reduced frequency. As will be shown later, the problems relating to frequencies addressed in this work are limited to frequencies below to this indicative value.

With the unsteady Kutta condition and the Kelvin Helmholtz theorem, this results in a non-linear equation system with n+2 unknown entities. The equations i=1, . . . , n fulfill the kinematic boundary conditions at all n control points, i=n+1 fulfills the unsteady Kutta condition, and i=n+2 fulfills the Kelvin Helmholtz theorem. For the equation system from 2.36, the following results for the left-hand side:

$$\sum_{j=1}^n (A_{ij}^n)_k (\sigma_j)_k + \tau_k \sum_{j=1}^n (B_{ij}^n)_k + (D_i^n)_k \Gamma_w = b_i \tag{2.57}$$

$$\left[\sum_{j=1}^n (A_{1j}^t)_k (\sigma_j)_k + \tau_k \sum_{j=1}^n (B_{1j}^t)_k + \sum_{m=1}^{k-1} (C_{1,m}^t)_k (\Gamma_{m-1} - \Gamma_m) + (D_1^t)_k \Gamma_w + V_{Stream}^t\right]^2 - $$

$$\left[\sum_{j=1}^n (A_{nj}^t)_k (\sigma_j)_k + \tau_k \sum_{j=1}^n (B_{nj}^t)_k + \sum_{m=1}^{k-1} (C_{n,m}^t)_k (\Gamma_{m-1} - \Gamma_m) + (D_n^t)_k \Gamma_w + V_{Stream}^t\right]^2 - $$

$$2l\frac{\tau_k - \tau_{k-1}}{t_k - t_{k-1}} = b_{n+1} \tag{2.58}$$

$$\tau_k l + \Gamma_w = b_{n+2} \tag{2.59}$$

As the parameters of the free vortices in the wake are already known values, these are transferred to the right-hand side of the equation system. The solution vector b is therefore $$b_i = -V_{Stream}^t - \sum_{m=1}^{k-1} (C_{i,m}^t)k(\Gamma_{m-1} - \Gamma_m) \tag{2.60}$$

$$b_{n+1} = 0 \tag{2.61}$$

$$b_{n+2} = \Gamma_{k-1}. \tag{2.62}$$

By solving the equation system, the source and vortex strengths of the profile contour searched for and the circulation of the vortex on the trailing edge are obtained. If $\theta_j$ is set at zero in the equations for the coefficients of influence, the coefficients of influence the x and z direction are obtained. In order to calculate the new positions of the free vortices for the next time step, the equations 2.25 and 2.2 are suitable to be used. Only the index n has to be replaced with x and t with z. With the size of the next time step, the new vortex coordinates are provided via $$(x_m)_{k+1} = (x_m)_k + (V_m^x)_k (t_{k+1} - t_k) \quad (2.63)$$

$$(z_m)_{k+1} = (z_m)_k + (V_m^z)_k (t_{k+1} - t_k). \quad (2.64)$$

In the next time step k+1, the vortex separated in time step k counts among the free vortices, and a new vortex forms on the trailing edge. In every time step, this means that the number of vortices in the wake increases.

For the calculation of the pressure coefficient of unsteady flows, the temporal change in the velocity potential has to be considered. Using the difference quotient, the unsteady Bernoulli equation produces the pressure coefficient $(c_{p,i})_k$:

$$(c_{p,i})_k = \left(\frac{V_{Stream}^t}{V_\infty}\right)^2 - \left(\frac{(V_i^t)_k}{V_\infty}\right)^2 - 2\frac{(\Phi_i)_k - (\Phi_i)_{k-1}}{t_k - t_{k-1}}. \quad (2.65)$$

Figure 11:
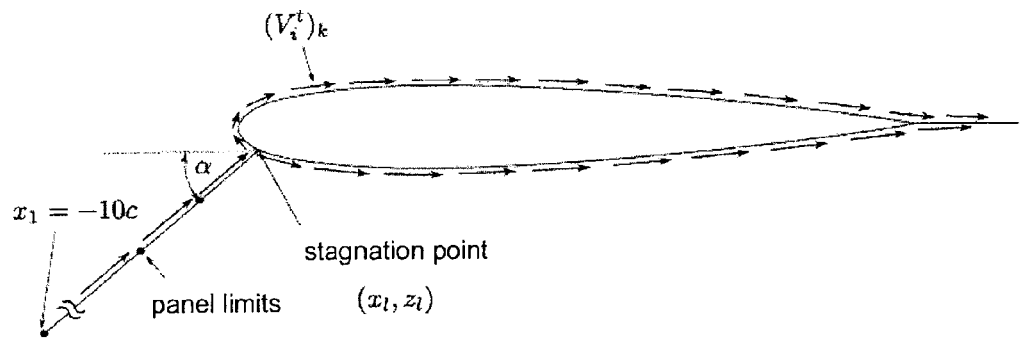
FIG. 11 illustrates tangential velocities along streamlines of a flap.

The velocity potential is suitable be determined by integration of the velocity field along a streamline, as schematically illustrated in FIG. 11. Due to the kinematic boundary condition, the airfoil surface is, as already mentioned, a streamline that flows upstream from the infinite to the stagnation point. As only the differences of the potential are required, it is sufficient to consider the induced velocities of the singularities. Its influence decreases with increasing distance $$\left(\frac{1}{r}\right)$$

from the airfoil, so that the induced velocities approach upstream to zero. According to Cebeci et al. (2005), the velocity at a distance of 10c is sufficiently small that it is suitable to be integrated from this point onwards. To simplify matters, the x coordinate of the point is set to −10c, and z is determined via the tangent of α. Integration initially occurs up to the stagnation point. For this purpose, the streamline is divided into individual panels. The size of the panels regressively decreases towards the airfoil in order to minimize the number of panels used in a similar manner to the discretization of the airfoil. The velocity is determined in the middle of the panel. By multiplying with the panel length and subsequently adding up, the potential at the stagnation point is obtained:

$$(\Phi_{St})_k = \sum_l (V_i^t)_k [(x_{l+1} - x_l)^2 + (z_{l+1} - z_l)^2]^{\frac{1}{2}}. \quad (2.66)$$

The tangential unit vector on the airfoil surface always points in the direction of the sequence of coordinates which run from the trailing edge (starting on the underside) towards the front and run back along the upper side. This means that the velocities to the left and right of the stagnation point have different algebraic signs. These have to be counted positively in the integration. For the velocity potential at the i-st control point, this finally results in $$(\Phi_i)_k = \quad (2.67)$$

$$\begin{cases} (\Phi_{St})_k + \sum_{j=i_{St}}^{i-1} (V_j)_k [(x_{j+1} - x_j)^2 + (z_{j+1} - z_j)^2]^{\frac{1}{2}} & \text{für } i_{St} \leq i \leq n \\ (\Phi_{St})_k + \sum_{j=i}^{i_{St}-1} \|(V_j)_k\| [(x_{j+1} - x_j)^2 + (z_{j+1} - z_j)^2]^{\frac{1}{2}} & \text{für } 1 \leq i < i_{St} \end{cases}$$

Implementation

In the following, by way of example, a type of implementation of the flow and structure model presented above is represented in MATLAB. Specific functions included in MATLAB and their efficient usage with regard to calculation are thereby addressed. The verification for the steady panel method occurs with Xfoil. For the unsteady method, the Wagner function is used as a reference. In closing, the linking of the flow and structure model is addressed, and the solution method used is described. The MATLAB code is presented below.

The panel method (Hess-Smith panel method) was achieved in MATLAB with several functions, the so-called function files. These files contain the algorithms for the individual operations.

They are suitable to be retrieved independently of one another and determine the corresponding function values from the arguments. The main function of the panel method is steady.m.

Three further sub-functions are consecutively accessed. These sub-functions work within the steady.m. environment. Each function has its own workspace, thereby comprising its own memory area which is reserved for each function. In retrieving a function, a new memory area is created that continues to exist as long as the function is active. The variables are only valid within this function. An exchange between the workspaces is only possible with corresponding commands. Following the completion of the operation, the workspace is deleted, and only variables which are defined as a return value are suitable to be used for further calculations. User inputs via the command window are filed in the so-called base memory area.

In the following list, the individual calculation steps of the sequence are stated. They are executed within the steady.m environment. The sub-functions are stated in parentheses.
1. Production of the panels and control points (distr.m)
2. Determination of the coefficients of influence from 2.27, 2.28, 2.29 and 2.30 (inflcoeff.n)
3. Establishing the solution vector b and solving of the equation system 2.36
4. Determination of the aerodynamic coefficients (cp_dist.m)

Figure 12:
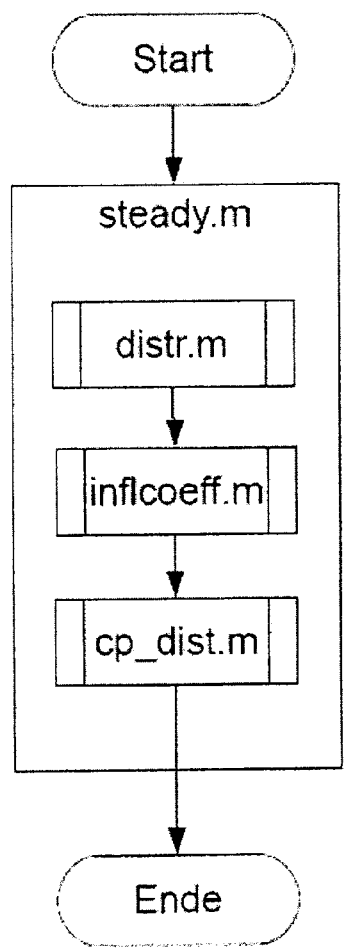
FIG. 12 is a flowchart of the steady flow solver.

FIG. 12 shows the corresponding flowchart. The flow analysis starts after the angle of attack α and the airfoil geometry are introduced as arguments to steady.m. The geometry has to be stored in a so-called structure array (data field). This is a data type which allows scalar values, vectors and strings to be stored in a continuous variable in the workspace. In this way, the information about the airfoil geometry is bundled into a single individual variable. This is called af and has the following set-up:
af.x x-coordinates of the geometry
af.z z-coordinates of the geometry
af.xU x-coordinates of the airfoil upper side
af.zU z-coordinates of the airfoil upper side
af.xL x-coordinates of the airfoil underside
af.zL z-coordinates of the airfoil underside
af.xC x-coordinates of the mean camber line
af.zC z-coordinates of the mean camber line The "." refers to the subordinate variables. For the steady calculation, only the first two variables are relevant. They contain the airfoil coordinates as vectors.

The control points and angle $\theta_i$ of the panels initially have to be generated. To do so, steady.m retrieves the sub-function distr.m. The airfoil coordinates are introduced as an argument. In order to calculate the panel angle $\theta_i$ (2.19), the choice of arc-tangent has to be considered. The simple arc-tangent does not offer the possibility to correctly reproduce the angle for every position of the panel. The value range is limited to $$-\frac{\pi}{2} < \arctan(x) < \frac{\pi}{2}.$$

Therefore, in many programming languages there is an arc-tangent function which is retrieved with two arguments. This serves to convert Cartesian coordinates into polar coordinates, and is thus defined across all four quadrants. In MATLAB, this function is retrieved via atan 2. Equation 2.19 takes the form theta(ii)=atan 2((−af.z(ii)+af.z(ii+1)),(−af.x(ii)+af.x(ii+1)))

The angle is displayed in radians. If not stated otherwise, this applies for all following calculations in which angles appear. The coordinates of the control points are defined via equation 2.23 and 2.24. The return values are stored in a new structure array. This has the following set-up:
coord.theta $\theta_i$
coord.n_x Normal unit-vector of the panel in the x-direction
coord.n_z Normal unit-vector of the panel in the z-direction
coord.t_x Tangent unit-vector of the panel in the x-direction
coord.t_z Normal unit-vector of the panel in the z-direction
coord.x_mi $x_{mi}$
coord.z_mi $z_{mi}$ With the control points detected and the panel data, the coefficients of influence of the sources and vortices are calculated in the function inflcoeff.m. In order to calculate the angle correctly, the arc-tangent with two arguments has to be used again for $\beta_{i,j}$ from equation 2.34. The character I is added to the matrix A (equation 2.37) as the solution matrix. The final row of this matrix contains the Kutta condition, which arises from equation 2.40. The equation system 2.36 is suitable to be solved in MATLAB by the Backslash operator. The operator initially tests the properties of the matrix I and then decides which solution strategy is most suitable. As the matrix I is quadratic, fully occupied and does not comprise any symmetry, the Gauss elimination is applied (Schweizer (2009)). The command is directly executed in the main function and is as follows:
Sing=I\b Sing is the solution vector as defined in equation 2.43. In general, the solution of a linear equation system via the direct determination of the inverse of the matrix I by means of the function inv(I) should be refrained from. With regard to calculation time, the Backslash operator is more suitable for such calculations, predominantly when dealing with large matrices.

From the determined source and vortex strengths, the velocity field along the airfoil surface is suitable to be calculated using 2.26. From this, the sub-function cp_dist.m computes the pressure distribution (2.46). The integration of the pressure along the airfoil surface provides the resulting force which acts upon the airfoil. Its component perpendicular to the freestream produces the coefficient of lift $c_L$. Due to the definition of the control points, the center point rule is applied for the integration of pressure, cf. FIG. 13a. The continuous curve shows the pressure distribution for n→∞. The calculation with the flow solver provides discrete values at the points $x_{mi}$. These are multiplied with the panel length. The pressure coefficients are broken down into their x-components and z-components (FIG. 13b) and their proportion defined perpendicular to the freestream. Summation across all of the panels results in the following for $c_L$ $$c_L = \sum_{i=1}^{n} (c_{p,i} \Delta x \cos\alpha + c_{p,i} \Delta z \sin\alpha) \quad (3.1)$$

$$\Delta x = x_{i+1} - x_i$$

$$\Delta z = z_{i+1} - z_i.$$

cp, cL, cD, coord, Sing, An and At are suitable to be returned as return values of the function steady.m. The complete command to retrieve the flow solver is
   [cp cL cD coord Sing An At]=steady(af,alpha)
   Table 3.1 lists all variable names used, their physical meaning and the data type of the variables.

TABLE 3.1

Nomenclature of the variables used in steady.m

| Variable | Description | Data type |
|---|---|---|
| alpha | Angle of attack α | Scalar value |
| af | contains the airfoil geometry | Struct-array |
| coord | Contains the discretization of the airfoil (panel data) | Struct-array |
| An, At, Bn, Bt | Coefficients of influence | Matrix |
| I | Solution matrix with Kutta condition | Matrix |
| b | Vel. comps. from the free freestream | Vector |
| Sing | Values of the singularities ($\sigma_j$ and $\tau$) | Vector |
| cp | Pressure distribution $c_p$ | Vector |
| cL | Pressure distribution $c_L$ | Scalar value |

Furthermore, a graphic user interface exists for the steady flow solver. The user interface is suitable to be started using the command gui in the command window. FIG. 14 shows the screenshot with calculations already being made. The above diagram on the left-hand side provides the distribution of the pressure coefficient along the chord. The diagram below shows the airfoil coordinates. Furthermore, the mean camber line is shown. The right-hand side of the user interface allows the flow parameters to be entered. In the Airfoil block, there are two different possibilities for creating the airfoil. For the creation of four and five-digit NACA airfoils, the airfoil generators by (Jayaraman und Jayaraman) are integrated. This creates the coordinates from the NACA airfoil number and the panel number entered. The distribution of nodes takes place according to equation 2.18. The loading of external airfoil coordinates takes place via the Load Airfoil entry. The file has to be available in ASCII format. The flap setting takes place in the Leading Edge block for the leading edge and in the Trailing Edge block for the trailing edge. The angle is entered in degrees. The x-coordinates are related to the chord c. From this, the function rot.m calculates the airfoil surface with deflected flaps. The algorithm is addressed in chapter 3.4. The angle of attack is entered in degrees in the Parameter block in the field AoA. The calculations are initiated via Start. The airfoil is created with the parameters selected and stored in the Base workspace under the name af2. Save cp offers the possibility of exporting the pressure distribution into a file. The file contains two columns, in which the coordinates $x_{mi}$ are saved in the first and the pressure values $c_{p,i}$ in the second. The tab is selected as a delimiter. The file extension is set by the user. Character encoding takes place in ASCII format. The Results block shows the results for the coefficients of lift and drag.

Figure 15:
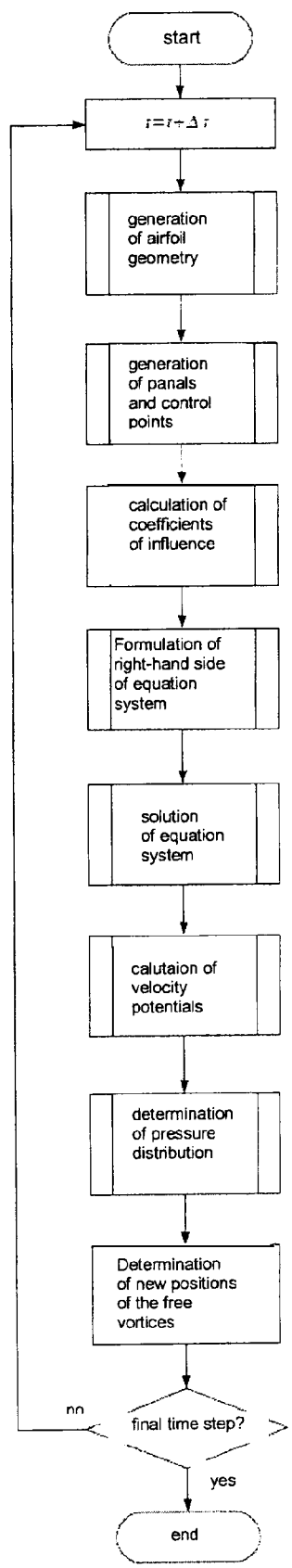
FIG. 15 is a flowchart of the calculation steps for the unsteady panel method.
Figure 16:
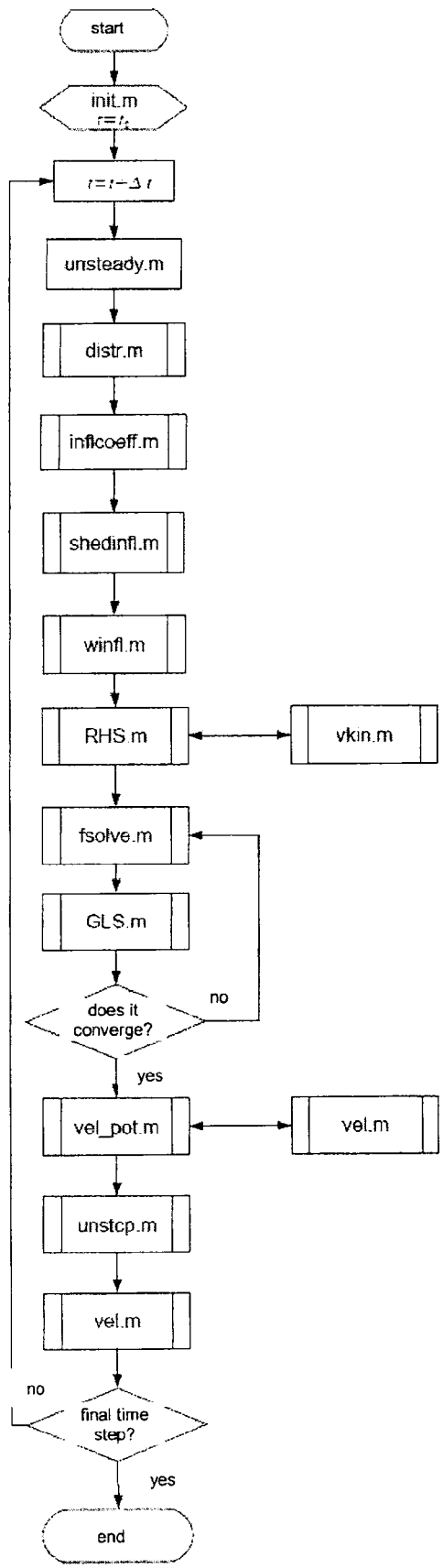
FIG. 16 is a flowchart for the retrieved functions of the unsteady flow solver.

The unsteady panel method is based on the function steady.m. The extension of the function is called unsteady.m. A loop is introduced which executes the calculation steps mentioned in chapter 2.1.3 at every time step within unsteady.m. FIG. 15 provides an overview. The blocks with doubled frame are calculation steps which were implemented in separate sub-functions. FIG. 16 shows the flowchart.

Table 3.2 lists the variables supplemented to table 3.1. Some variables are required by several sub-functions. These variables are therefore stored in the so-called global Workspace, which is a memory area accessible for all functions in MATLAB. This therefore facilitates the exchange of variables, including the variables An, At, Bn, Bt, Cn, Ct, Dn, Dt, Phi alt, af, af0, coord, x_shed and z_shed. In order to access this Workspace, the variables to be used have to be defined globally. This is achieved by using the command global followed by the names of the variables.

The unsteady calculation requires the determination of initial values. In accordance with 2.55 and 2.65, values from previous time steps are required for each calculation. These initial values have to be provided at the point in time $t_0$. The function init.m is responsible for this. By means of steady.m, a steady initial solution originating from the arguments af0 and alpha is first calculated for the source and vortex distribution.

TABLE 3.2

Nomenclature of the additional variables used in unsteady.m

| Variable | Description | Type |
|---|---|---|
| alpha | angle of attack α | scalar/vector |
| t | time | vector |
| af0 | contains the unmodified airfoil geometry | struct-array |
| af | contains the new airfoil geometry | struct-array |
| Cn, Ct, Dn, Dt | influence coefficient of the wake | matrix |
| b | velocity components of the free freestream and the kinematic motion | vector |
| LE | flap angle of leading edge γ | scalar |
| TE | flap angle of trailing edge β | scalar |
| LE0 | flap angle of leading edge previous time step | scalar |
| TE0 | flap angle of trailing edge previous time step | scalar |
| xLE | x-coordinate of the edge pivot of the leading edges | scalar |
| xTE | x-coordinate of the edge pivot of the trailing edge | Scalar |
| Phi_neu | velocity potential at current point in time | vector |
| Phi_alt | velocity potential at the previous point in time | vector |
| Vor | vortex forces of the vortices in the wake | vector |
| x_w | x-coordinate of the vortices in the wake | vector |
| z_w | z-coordinate of the vortices in the wake | vector |
| tau | vortex force at the airfoil | vector |
| Sing | value of singularities $((\sigma_j)_k, \tau_k$ and $\Gamma_w)$ | vector |

From this, the velocity potential is determined through the function vel_pot.m; this implementation will be addressed in detail during the course of this chapter. With these initial values the calculation is suitable to be started with unsteady.m. At the beginning, the new positions of the free vortices in the wake are determined according to 2.63 and 2.64. The velocities in x and z directions are calculated in the sub-function vel.m. The function rot.m generates the new airfoil coordinates with deflected flaps. By using the function distr.m, the panels and control points are created for the new airfoil geometry. inflcoeff.m calculates the influence coefficients of the panels. Both the latter mentioned functions remain unchanged in comparison to the steady solver. The modeling of the wake is achieved with discrete vortices. Their influence to the control points is determined via 2.50, 2.51, 2.52 and 2.53 in the sub-functions shedinfl.m or winfl.m. They require the positions of the vortices $(x_s, z_s)$, or $(x_m, z_m)$ as arguments. The right side of the equation system is subsequently set up according to 2.60, 2.61 and 2.62. This is achieved using the sub-function RHS.m. $V_{Stream}$ is calculated from the geometric velocity and the velocity of the freestream. This calculation was made using sub-function vkin.m. As arguments, the difference between the flap angles and the coordinates of the edge pivots is introduced. The angular velocity is determined via the difference of the flap angles with the size of the interval Δt. The velocity of the points of the flaps is provided by Euler's law via $$V_{geo,i}{}^x = -\omega \Delta z \qquad (3.2)$$

$$V_{geo,i}{}^z = \omega \Delta x \qquad (3.3)$$

wherein Δz and Δx represent the distance of the control points from the pivot. The velocities are returned to RHS.m.

The solution of the non-linear equation system from 2.57, 2.58 and 2.59 is achieved by using the function fsolve within MATLAB. Therefore, the equation system has to be written into a separate function called GLS.m. For the solution of the system, MATLAB utilizes an iterative procedure. The source and vortex forces of the previous time step are used as initial values. They are transferred to vector Sing0. The result is suitable to be tested for convergence with the return value exitflag. If value exitflag=1 is retrieved, the iteration process is successful; otherwise, the calculation will be aborted.

The pressure distribution is now determined by the source and vortex strengths which are now known. For this purpose, the velocity potential has to be calculated at each control point. As already mentioned in section 2.1.3, a change of sign of the velocities takes place at the stagnation point. In MATLAB a change of sign is suitable to be determined via the function sign. This is applied to a vector vtang, containing the induced velocities at the control points. As a return value, sign retrieves a vector which takes over value 1 for positive entries and value −1 for negative values from vtang. The entire command is
vorzeichen=sign(vtang);
staupkt=find(diff(vorzeichen)>0);

The coordinates of the stagnation point are suitable to be retrieved via the commands
coord.x_mi(staupkt)
coord.z_mi(staupkt)

The velocity potential of the control points is suitable to be determined via 2.66 and 2.67. The velocity potential is returned as a vector. With unstcp.m the pressure distribution is calculated via equation 2.65. The integration follows the description provided in section 3.1.

The verification of the steady panel method occurs via a comparison with Xfoil. Xfoil was developed in the 1980s by Drela (1989) at Massachusetts Institute of Technology. As in the HSPM, the source distributions are assumed to be constant above the panels. The vortex distributions, however, are approximated with a linear course.

Using these two methods, the pressure distribution of a NACA 0012 airfoil was determined. The results are presented in FIG. 17*a* for an angle of attack of 5° and in FIG. 17*b* for an angle of attack of 10°. It is possible to observe that HSPM provides the same results as Xfoil, i.e. the assumption regarding the vortex strength along a panel as being constant has no significant influence on the accuracy of the result.

Figure 18A:
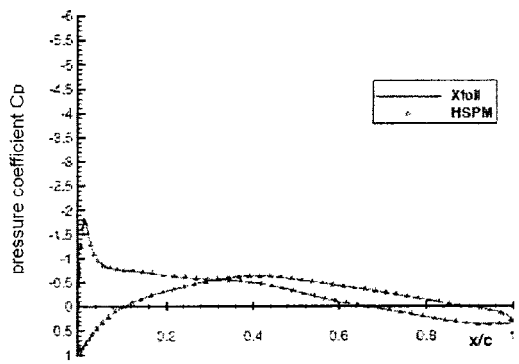
FIG. 18a is a graph showing a comparison Xfoil with HSPM for NACA $64_3618$, number of panels n=300, $\alpha=-5°$.
Figure 18B:
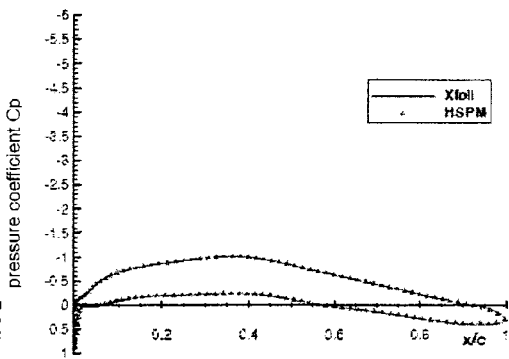
FIG. 18b is a graph showing a comparison Xfoil with HSPM for NACA $64_3618$, number of panels n=300, $\alpha=0°$.
Figure 18C:
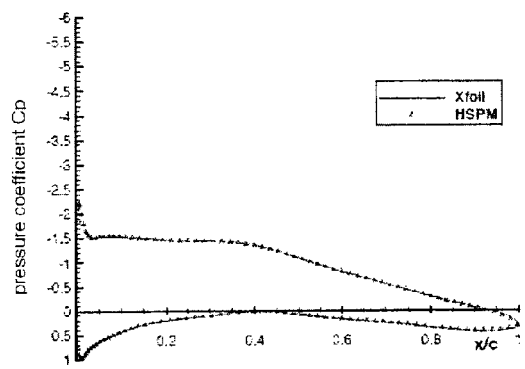
FIG. 18c is a graph showing a comparison Xfoil with HSPM for NACA $64_3618$, number of panels n=300, $\alpha=5°$.
Figure 18D:
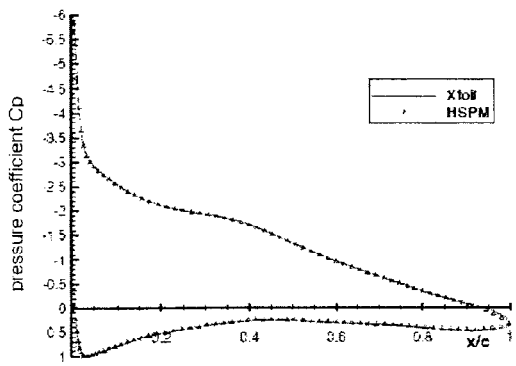
FIG. 18d is a graph showing a comparison Xfoil with HSPM for NACA $64_3618$, number of panels n=300, $\alpha=10°$.

As second airfoil the NACA $64_3618$ was reviewed. The courses of pressure are shown in FIG. 18*a* for α=−5°, in 18*b* for α=0°, in 18*c* for α=5° and in 18*d* for α=10°. Minor variations are suitable to be observed at the trailing edge.

These are due to the small number of airfoil coordinates extracted from Abbot and Doenhoff (1959). Experience shows that Xfoil as well as HSPM are sensitive to the quality of the airfoil coordinates. In the present work, the number of coordinates is increased via spline interpolation. It is, however, recommendable to explicitly check the results when using new coordinates.

The coefficient of lift results from the integration of the pressure course. By comparing the coefficients, the implemented integration method is suitable to be verified. FIGS. 19a and 19b show the $c_L$-α-diagram for NACA 0012 and for NACA $64_3618$, respectively.

The integration of HSPM matches with that of Xfoil. The dotted line represents the viscous $c_L$ course. For an angle of attack of up to 15 degrees, the potential theory produces effective concordance with friction related values. Higher angles of attack will lead to flow separation and therefore a slackening of lift. This separation results from friction and thus cannot be considered purely in conjunction with the potential theory.

The accuracy of the calculation predominantly depends on the amount of panels used.

This influence is made clear in FIG. 20 with the example of NACA 0012 (α=10°). The solid line shows the determined course of pressure for a number of panels n=200. In comparison to this, a calculation with 20 panels was executed (chain-dotted line). It is easy to observe that the area at the leading edge, i.e. the maximum level of suction as well as the stagnation point, is not mapped correctly if the resolution is too low.

The accuracy of a calculation is opposed to the increase in the calculation time associated with a growing number of panels. Furthermore, the unsteady panel method accesses the algorithms of the steady solver during each time step. For the determination of the optimal number of panels, the extreme values of the pressure distribution, i.e. $c_{p,min}$ and $c_{p,max}$, were compared for different panel numbers with a reference calculation of 1000 panels. The result is shown in FIG. 21a for NACA 0012 and in FIG. 21b for NACA 4415. In both examples, the variation for a panel number of 300 lies below 0.1% ($\Delta c_p$=4.9·10$^{-3}$). The calculation time is t=0.41s; see FIG. 22. All calculations presented in this document are executed with the number of panels n=300.

The unsteady method is verified via Wagner's Theory (1925). The theory enables the calculation of the unsteady lift of a planar plate upon modification of the angle of attack.

For this purpose, the so-called Wagner Function is superimposed with the quasi-steady lift $c_{L,st}$. The function describes the influence of the wake on the planar plate and is referred to as $\Phi(s)$, wherein s represents the dimensionless time defined via $$s(t) = \frac{2}{c}\int_0^t V_\infty \, dt \qquad (3.4)$$

The unsteady lift then results in:

$$c_L(s) = c_{L,st}\Phi(s) \qquad (3.5)$$

When applying a quasi-steady calculation, a sudden modification of the angle of attack leads to a constant $c_L$ course. In 3.5, the Wagner Function provides an exponentially increasing lift, thus considering the influence of the wake which is being formed. Different approximations for the Wagner Function are described in the literature.

The function applied in this work goes back to Jones (1938) and is indicated via:

$$\phi(s) \approx 1{,}0 - 0{,}165 e^{-0{,}0455s} - 0{,}335 e^{-0{,}3s}. \qquad (3.6)$$

Figure 23:
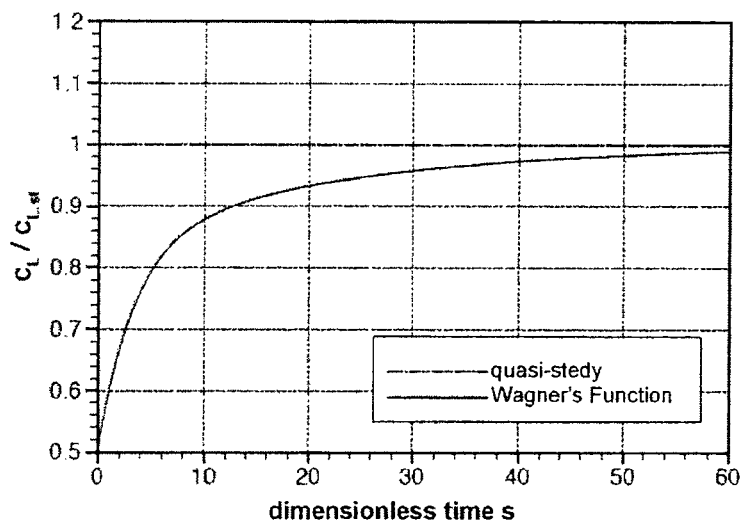
FIG. 23 is a graph showing Wagner's Function.

FIG. 23 shows the course of the Wagner Function, wherein the ordinate represents the correlation with the quasi-steady lift $c_{L,st}$.

For s→∞, Wagner's Function converges to $c_{L,st}$.

Figure 24:
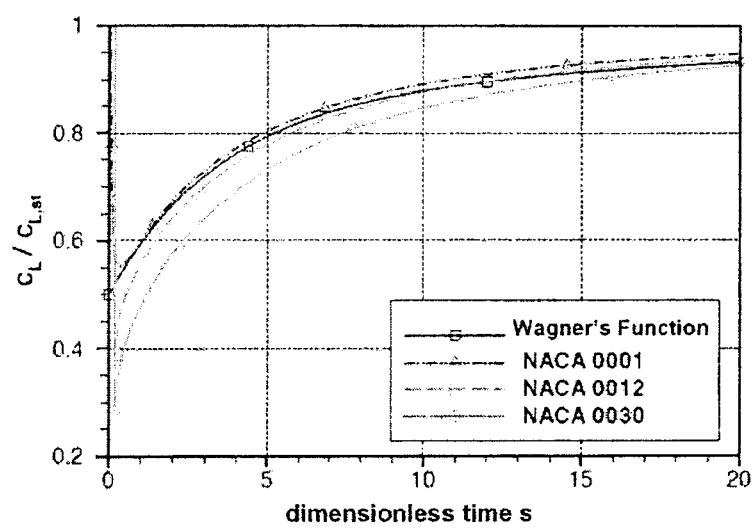
FIG. 24 is a graph showing a comparison of the unsteady panel method to Wagner's Function for different airfoil thicknesses.

As the planar plate is theoretically infinitesimally thin, NACA 0001 is used for verification in order to facilitate a comparison with the panel method. The result is shown in FIG. 24. Effective concordance is suitable to be observed. The results for NACA 0012 and NACA 0030 illustrate the importance of the airfoil thickness to the unsteady behavior. The influence of the wake increases as the airfoil thickness increases. As airfoils in this work are calculated with a thickness of 18%, it is evident that the application of a panel method is required.

Furthermore, the calculations are suitable to be compared to theoretical considerations via the visualization of flows. If the angle of attack is suddenly modified, vortices are formed in the wake. Vortices which are transferred to the wake immediately after the modification of the angle of attack have a high vortex force due to the significant change in airfoil circulation. As a result of this, they induce high velocities in their environment and have a major influence on the flow directions of their adjacent vortices. As a consequence, this interaction causes the wake to roll up in a downstream direction.

Figure 25:
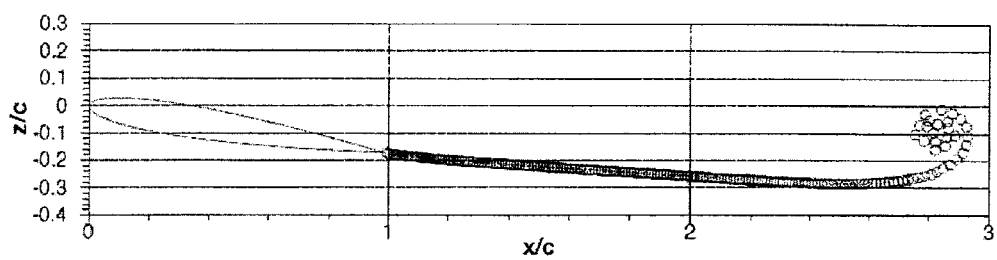
FIG. 25 is a graph showing flow visualization for a modification of the angle of attack from $\alpha=0°$ to $\alpha=10°$, NACA 0012.

The unsteady method is suitable to show this effect. FIG. 25 shows the result of a sudden modification of the angle of attack from α=0° to α=10°. The circles represent individual, discrete vortices.

Figure 26:
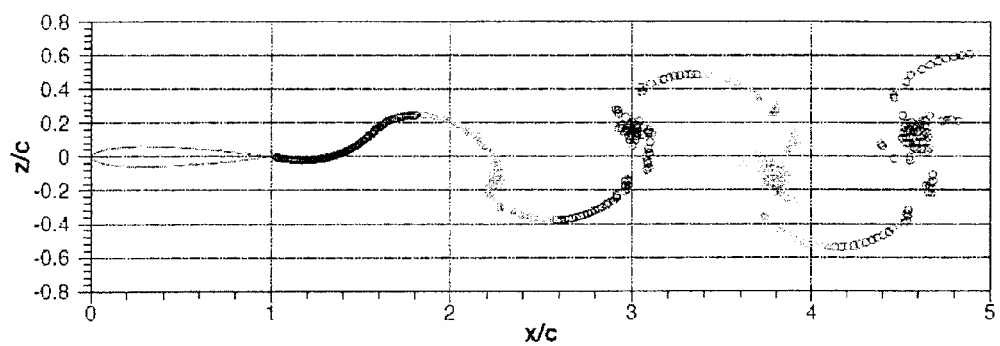
FIG. 26 is a graph showing flow visualization for a sinusoidal modification of the angle of attack $\alpha=10° \sin(2t)$, k=2.0, NACA 0012.

If the airfoil executes a sinusoidal motion in the flow, this leads to the formation of the Kármán vortex street. For a reduced frequency of k=2.0, the result shown in FIG. 26 is achieved via the panel method. The triangles and circles are vortices with opposing algebraic signs, respectively.

Figure 27:
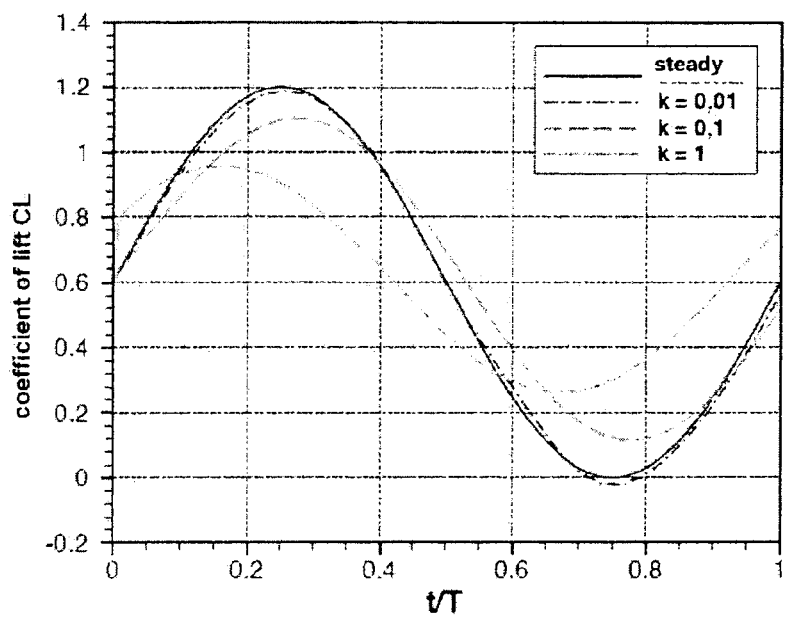
FIG. 27 is a graph showing a coefficient of lift $c_L$ dependent on the reduced frequency; NACA 0012; $\alpha(t)=5°+5° \sin(\omega t)$.

As described in chapter 2.1.3, the reduced frequency is a measure for the unsteadiness of a flow. FIG. 27 shows a comparison of different, reduced frequencies with the steady solution. The angle of attack follows a sinusoidal course:

$$\alpha(t) = 5° + 5° \sin(\omega t) \qquad (3.7)$$

wherein ω is the angular frequency and is determined via 2.56. The time t was non-dimensionalized by the period duration T. The solid line corresponds to the quasi-steady coefficient of lift $c_{L,st}$. Due to the influence of the wake, the course of the unsteady observation is phase-shifted. As described by Wagner (1925), the lift appears with delay. The shed vortices at the trailing edge induce velocities which cause an effectively smaller angle of attack. As a result of this, the amplitudes are smaller than in quasi-steady observation. For a reduced frequency of k=1 (dotted line), the unsteady calculation deviates significantly from the steady solution. With a decreasing reduction in frequency, the influence of the wake is reduced. The steady and unsteady models provide the same results for frequencies reduced to below 0.01. As the present work examines modifications of the angle of attack in the frequency range of k<0.01, the aeroelastic simulations are executed with the steady panel method and a focus on the calculation time. This is possible in this respect, since the pivotal and torsional degree of freedom resulting from the overall elasticity of the wing is not taken into consideration.

The equation of motion from 2.69 is calculated in MATLAB with an ode-solver. These are MATLAB-internal functions for solving common differential equations of the first order. MATLAB provides different solution methods. In this work, the ode23s-solver is used. It is based on a Runge-Kutta-Rosenbrock Method and is suitable for rigid differential equations.

Figure 28:
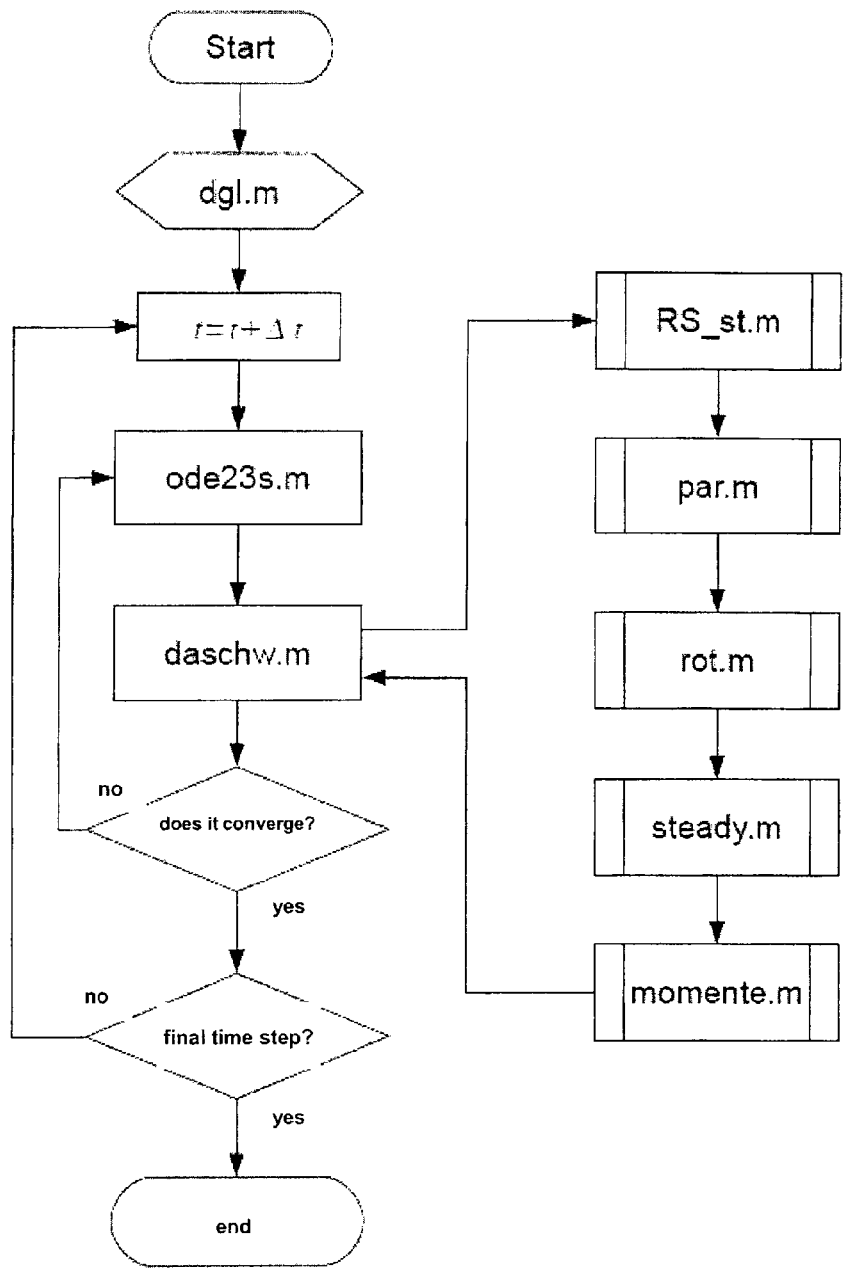
FIG. 28 is a flowchart of the FSI solver.

FIG. 28 shows the flowchart for solving the equation of motion. The calculation is initiated via the script dgl.m. The initial conditions and parameters are set up and introduced to the ode23s solver. The latter executes the integration method. In doing so, MATLAB retrieves the equation of motion in each integration step.

The ode-solvers require a reformulation of the equation of motion, which leads to a differential equation system of the first order. With $\gamma_1 = \gamma$ and $\gamma_2 = \dot{\gamma}$, 2.69 becomes $$\dot{\gamma}_1 = \gamma_2 \quad (3.8)$$

$$\dot{\gamma}_2 = -\frac{k_\gamma}{(\theta_l + \theta_t i^2)}\gamma_1 - \frac{d_\beta i}{(\theta_l + \theta_t i^2)}\gamma_2 + \frac{\rho V_\infty^2 c^2 b}{2(\theta_l + \theta_t i^2)}(c_{M_{LE}} + c_{M_{TE}}).$$

The differential equation system is stored in the function daschw.m. The ode-solver transfers the time t of the current iteration step and the flap deflection $\gamma$ and the velocity $\dot{\gamma}$ as arguments. For the calculation of the moment coefficients $c_{M_{LE}}$ and $c_{M_{TE}}$, the sub-function RS_st.m is retrieved. It forms the interface between the structure model and the aerodynamics. Firstly, the angle of attack for the current iteration step is determined with t. This is achieved via the function par.m. It comprises the course of the angle of attack $\alpha(t)$ over the time t in form of an equation. If angles of attack are loaded from an external file, a continuous course is generated with the help of a spline interpolation. rot.m generates the transformed airfoil coordinates from the transferred flap angles. The airfoil contour af, the flap deflections $\gamma$ and $\beta$ as well as the x-coordinates $x_{ie}$ and $x_{te}$ of the flap edge pivots are transferred as arguments. The pivots are on the mean camber line. Their z-components are determined through a spline interpolation of the mean camber line. The airfoil points of the flaps are transformed using a rotation matrix:

$$\begin{pmatrix} x_{kl,i} \\ z_{kl,i} \end{pmatrix} = \begin{bmatrix} \cos(-\gamma) & \sin(-\gamma) \\ \sin(-\gamma) & \cos(-\gamma) \end{bmatrix} \cdot \begin{pmatrix} x_i \\ z_i \end{pmatrix} \quad f\ddot{u}r \ x_i \leq x_{le} \quad (3.9)$$

$$\begin{pmatrix} x_{kl,i} \\ z_{kl,i} \end{pmatrix} = \begin{bmatrix} \cos(\beta) & \sin(\beta) \\ \sin(\beta) & \cos(\beta) \end{bmatrix} \cdot \begin{pmatrix} x_i \\ z_i \end{pmatrix} \quad f\ddot{u}r \ x_i \geq x_{te} \quad (3.10)$$

Figure 29:
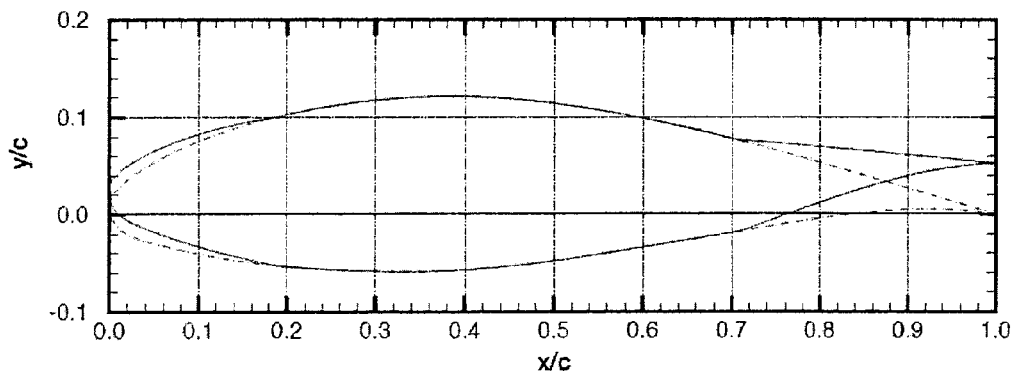
FIG. 29 is a graph showing a flap deflection generated with rot.m, NACA $64_3618$; $\gamma=5°$; $\beta=10°$; $x_{ie}=0.2$; $x_{te}=0.7$.

As the leading edge flap rotates in a mathematically negative sense, $\gamma$ is counted as being negative. FIG. 29 shows the result of a flap deflection for $\gamma=5°$ and $\beta=10°$ using the example of NACA $64_3618$. The chain-dotted line represents the airfoil in a non-deflected state; the solid line shows the transformation using the rotation matrix 3.9 and 3.10. With the airfoil coordinates and the angle of attack, the panel method is started via steady.m.

The pressure distribution is transferred to the function momente.m. The latter calculates the flap moments using the integration method for the coefficient of lift described in section 3.1, wherein the integration limits are limited to the control points of the flaps:

$$c_{M_{LE}} = \sum_{i=1}^{k} (c_{p,i}\Delta x(x_{mi} - x_{le}) + c_{p,i}\Delta_z(z_{mi} - z_{le})) \quad f\ddot{u}r \ x_k \leq x_{le} \quad (3.11)$$

$$c_{M_{TE}} = \sum_{i=1}^{k} (c_{p,i}\Delta x(x_{mi} - x_{te}) + c_{p,i}\Delta_z(z_{mi} - z_{te})) \quad f\ddot{u}r \ x_k \geq x_{te}.$$

The moments are returned to daschw.m and inserted into the equation system 3.8. The convergence of the numerical integration in each time step is checked by the ode-solver itself. For a calculation-efficient solution of the system 3.8, the ode solver also comprises an adaptive time step control.

Advantages of the Invention

For a parallel verification of the advantages, apart from some experimental examinations, the following calculations were executed using suitable methods.

The following shows the result of a parameter study for the flow and structure sizes. For this purpose, their influences on the coefficient of lift $c_L$ were examined. The aim of the passive change in camber is to reduce the fluctuations of the lift caused by changes in the angle of attack. For the evaluation of the results, the relation between the difference of the maximum coefficient and the minimum coefficient of the elastic airfoil and the difference of those coefficients of the rigid airfoil is determined:

$$\frac{(c_{Lmax} - c_{Lmin})_{elastisch}}{(c_{Lmax} - c_{Lmin})_{starr}} \quad (4.1)$$

This allows a direct reading of the reduction, which is indicated in the form of a table.

In this chapter, the modification of the angle of attack is assumed to be a sine oscillation around an initial angle of attack. This leads to a decrease and an increase in camber of the airfoil. One period over which the behavior of the coefficient of lift $c_L$ is shown is always calculated. The parameters which have been set up and the airfoils used are listed in the captions of the figures. The chord is c=0.3 m in all of the calculations. Furthermore, the tables contain the respective maximum and minimum flap angles. All aeroelastic simulations are executed via the steady panel method. It has to be considered that the application of the aerodynamic loads will result in a change in camber at the elastic airfoil. In order to compensate for this, a preload moment is imposed. The size depends on the steady aerodynamic flap moment at the design point.

Figure 30A:
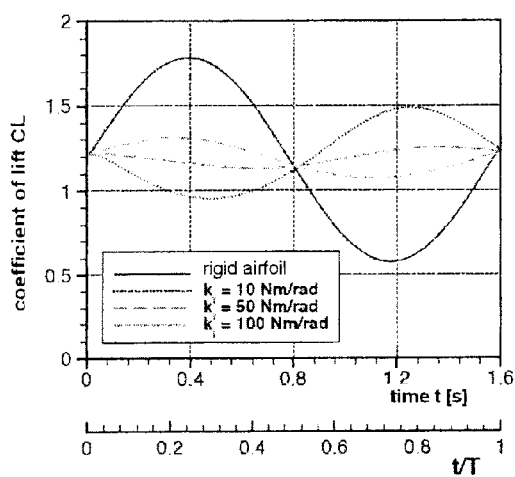
FIGS. 30a and 30b are graphs showing an influence of stiffness $k_\gamma$ on coefficient of lift $c_L$; NACA $64_3618$; $V_\infty=60$ m/s; $\alpha(t)=5°+5° \sin(4t)$; $x_{ie}=0.2$; $x_{te}=0.7$; $d_\beta=1$ Nms/rad; i=3.
Figure 30B:
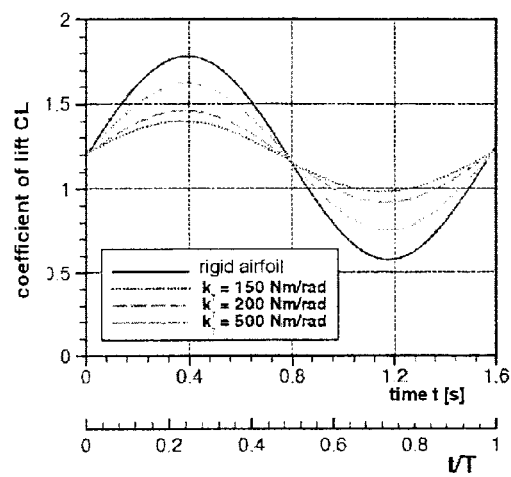

The diagrams in FIGS. 30a and 30b show the influence of the torsional stiffnesses. As expected, the reduction of the amplitudes decreases with increasing stiffness, c.f. table 4.1. It has to be noted that if stiffness becomes too negligible (in the present example between $k_\gamma=50$ Nm/rad and $k_\gamma=100$ Nm/rad), the change in camber becomes so large that a change of sign takes place in the gradient $\delta c_L/\delta\alpha$. With a torsional stiffness $k_\gamma=10$ Nm/rad, this causes that the amplitudes increase again. A maximum reduction is therefore to be expected with a stiffness between $k_\gamma=50$ Nm/rad and $k_\gamma=100$ Nm/rad. With a stiffness of $k_\gamma=50$ Nm/rad, a reduction of 89.7% is achieved.

TABLE 4.1

Difference of coefficient of lift and minimum or maximum flap deflections upon variation of spring stiffness

| Spring stiffness [Nm/rad] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 10 | 0.444 | 55.6 | 3.48 | −3.81 | 10.43 | −11.43 |
| 50 | 0.103 | 89.7 | 2.65 | −2.78 | 7.94 | −8.35 |
| 100 | 0.196 | 80.4 | 2.03 | −2.11 | 6.08 | −6.33 |
| 150 | 0.345 | 65.5 | 1.65 | −1.70 | 4.94 | −5.11 |
| 200 | 0.450 | 55.0 | 1.38 | −1.43 | 4.13 | −4.30 |
| 500 | 0.720 | 28.0 | 0.69 | −0.74 | 2.08 | −2.21 |

Figure 31A:
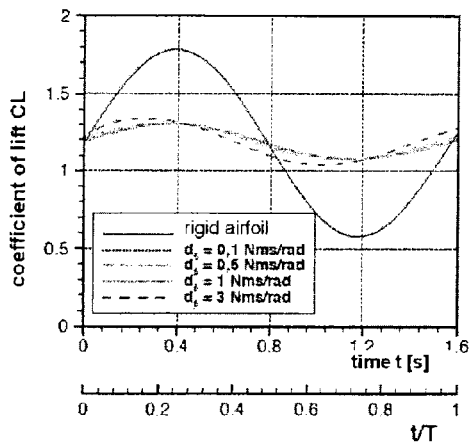
Figure 31B:
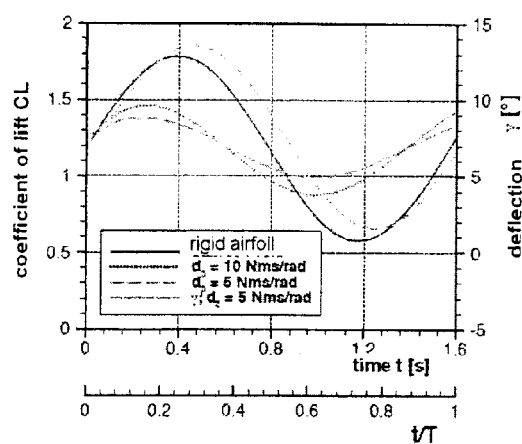

FIGS. 31a and 31b represents the influence of the damping. With an increasing damping constant, the flap deflections become smaller, and the reduction of the amplitudes declines; see table 4.2. Furthermore, a phase shift of the coefficient of lift $c_L$ of the elastic airfoil in comparison to the rigid airfoil is suitable to be observed as the damping constant increases. For this reason, FIG. 31b presents the flap deflection at the trailing edge for $d_\beta$=5 Nms/rad (chain-dotted line). The deflections are also phase-shifted, but delayed. It can be assumed that due to the delay, the surrounding airflow of the airfoil is influenced in such way that the maximum coefficient of lift is achieved prematurely with an increasing damping. However, it is not possible to conclusively clarify this relation in the context of the present work.

TABLE 4.2

Difference of coefficient of lift and minimum or maximum flap deflections upon variation of the damping constant

| Damping constant [Ns/m] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 0.1 | 0.188 | 81.2 | 2.03 | −2.11 | 6.09 | −6.34 |
| 0.5 | 0.190 | 81.0 | 2.03 | −2.11 | 6.09 | −6.34 |
| 1 | 0.196 | 80.4 | 2.03 | −2.11 | 6.08 | −6.33 |
| 3 | 0.249 | 75.1 | 2.00 | −2.08 | 6.01 | −6.25 |
| 5 | 0.328 | 77.2 | 1.96 | −2.03 | 5.87 | −6.09 |
| 10 | 0.521 | 47.9 | 1.79 | −1.84 | 5.38 | −5.51 |

Figure 32A:
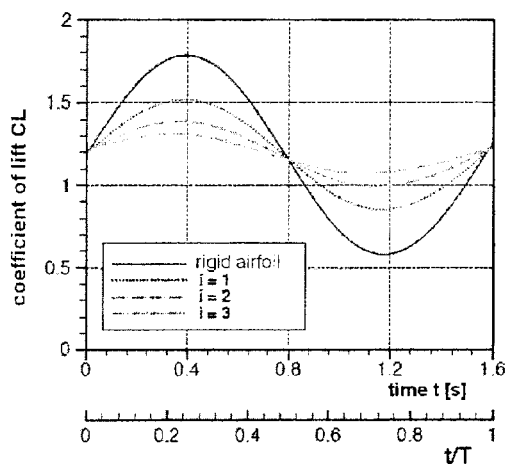
FIGS. 32a- and 32b are graphs showing influence of transmission i on the coefficient of lift $c_L$; NACA$64_3618$; $V_\infty=60$ m/s; $\alpha(t)=5°+5° \sin(4t)$; $x_{ie}=0.2$; $x_{te}=0.7$; $k_\gamma=100$ Nm/rad; $d_\beta=1$ Nms/rad; i=3.
Figure 32B:
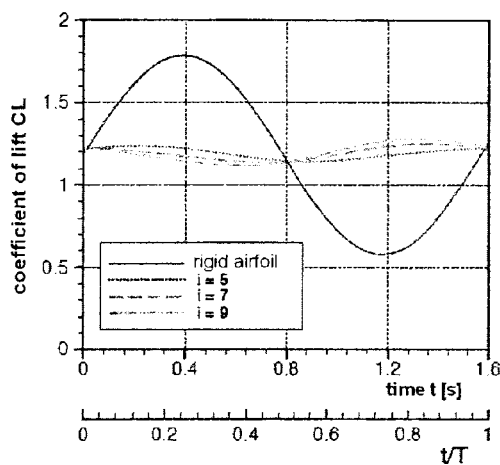

FIGS. 32a and 32b shows the $c_L$-courses upon variation in transmission. As transmission increases, the reduction of the amplitude increases. From a transmission ratio of i=7 on, another transition point can be observed; this is also the case for the stiffness. It is suitable to be observed at the flap deflections in table 4.3 that the airfoil camber increases or decreases too severely. Furthermore, data shows that the greatest possible reduction is achieved with a transmission of i=5. This amounts to 92.2%. As transmission increases, a phase shift is suitable to be observed. This is based on the fact that the damping force results from the flap speed, which is, in turn, dependent on the transmission ratio. If this relation is compared with the results from FIG. 31b, the differing phase shift is suitable to be explained with the higher flap deflections due to increasing transmission.

TABLE 4.3

Difference of coefficient of lift and minimum or maximum flap deflections upon variation of the transmission

| Transmission [-] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 1 | 0.551 | 44.9 | 3.53 | −3.54 | 3.53 | −3.54 |
| 2 | 0.326 | 67.4 | 2.57 | −2.64 | 5.15 | −5.28 |
| 3 | 0.196 | 80.4 | 2.03 | −2.11 | 6.08 | −6.33 |
| 5 | 0.078 | 92.2 | 1.43 | −1.51 | 7.16 | −7.53 |
| 7 | 0.093 | 90.7 | 1.10 | −1.17 | 7.73 | −8.21 |
| 9 | 0.134 | 86.6 | 0.90 | −0.96 | 8.09 | −8.65 |

The moment of inertia assumed in the previous simulations is based on the weight of a 1 m-long flap. This consists of a glass fiber surface with a polystyrene core. The moments of inertia of the leading edge and trailing edge flap amounts to:

$\theta_{l,Gl}$=3,425·10$^{-4}$ kgm$^2$ $\theta_{t,Gl}$=3,447·10$^{-4}$ kgm$^2$.

For comparison purposes, the moment of inertia of an aluminum flap with a wall thickness of 3 mm is to be examined. This leads to the moments of inertia:

$\theta_{l,Al}$=19,837·10$^{-4}$ kgm$^2$ $\theta_{t,Al}$=25,423·10$^{-4}$ kgm$^2$.

Figure 33:
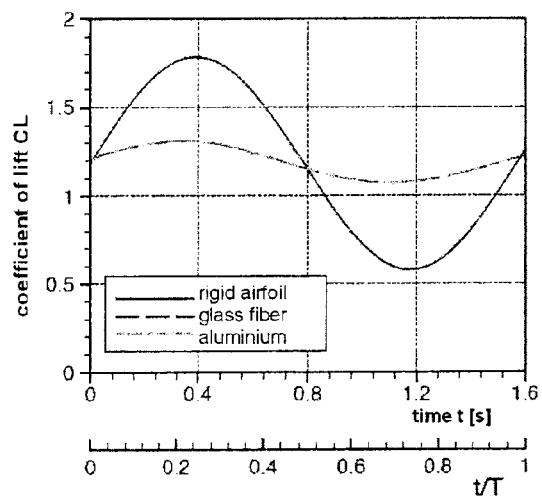
FIG. 33 is a graph of influence of the moments of inertia $\theta_i$ und $\theta_r$ on the coefficient of lift $c_L$; NACA $64_3618$; $V_\infty=60$ m/s; $\alpha(t)=5°+5° \sin(4t)$; $x_{ie}=0.2$; $x_{te}=0.7$; $k_\gamma=100$ Nm/rad; $d_\beta=1$ Nms/rad; i=3.

The results are represented in FIG. 33 and table 4.4. Moments of inertia of this order of magnitude have no influence on the properties of lift or the flap deflections.

TABLE 4.4

Difference of coefficient of lift and minimum or maximum flap deflections upon variation of the moment of inertia

| Material [-] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| Glass fiber | 0.195 | 80.5 | 2.03 | −2.11 | 6.09 | −6.34 |
| Aluminum | 0.196 | 80.4 | 2.03 | −2.11 | 6.08 | −6.33 |

Figure 34A:
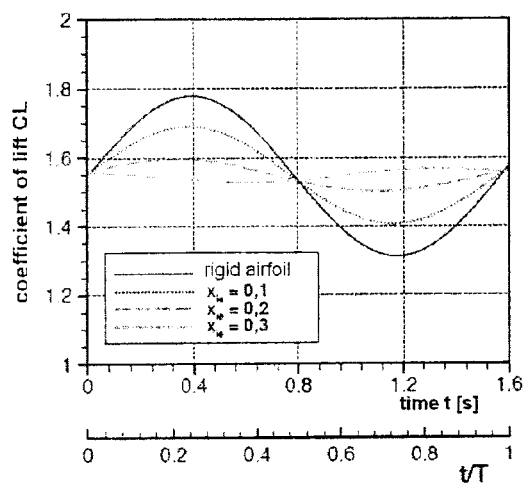
FIG. 34a is a graph showing influence of the flap length on the coefficient of lift $c_L$; NACA $64_3618$; $V_\infty=60$ m/s; $\alpha(t)=5°+5° \sin(4t)$; $k_\gamma=100$ Nm/rad; $d_\beta=1$ Nms/rad; i=3; Variation of the leading edge flap; $x_{te}=0.7$
Figure 34B:
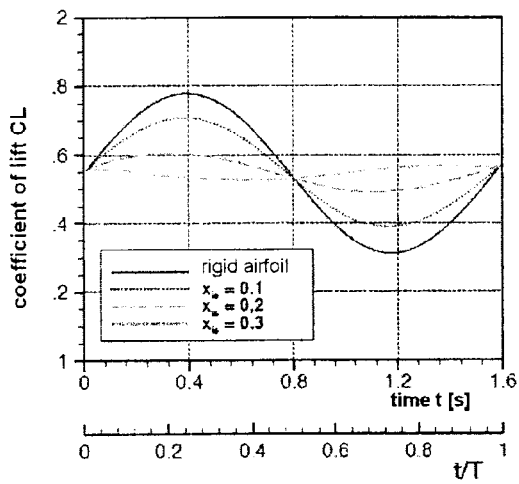
FIG. 34b is a graph showing influence of the flap length on the coefficient of lift $c_L$; NACA $64_3618$; $V_\infty=60$ m/s; $\alpha(t)=5°+5° \sin(4t)$; $k_\gamma=100$ Nm/rad; $d_\beta=1$ Nms/rad; i=3; Variation of the trailing edge flap; $x_{te}=0.8$.
Figure 34C:
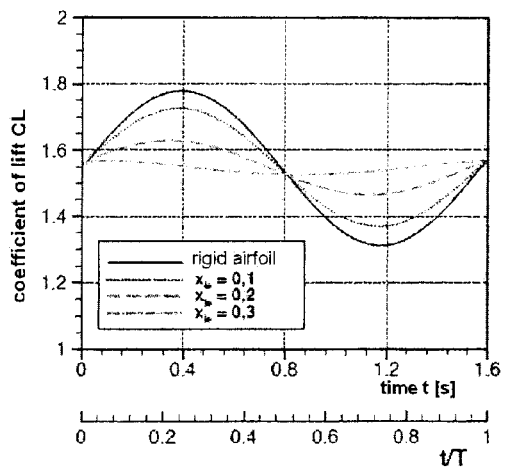
FIG. 34c is a graph showing influence of the flap length on the coefficient of lift $c_L$; NACA $64_3618$; $V_\infty=60$ m/s; $\alpha(t)=5°+5° \sin(4t)$; $k_\gamma=100$ Nm/rad; $d_\beta=1$ Nms/rad; i=3; Variation of the trailing edge flap; $x_{te}=0.9$.
Figure 35A:
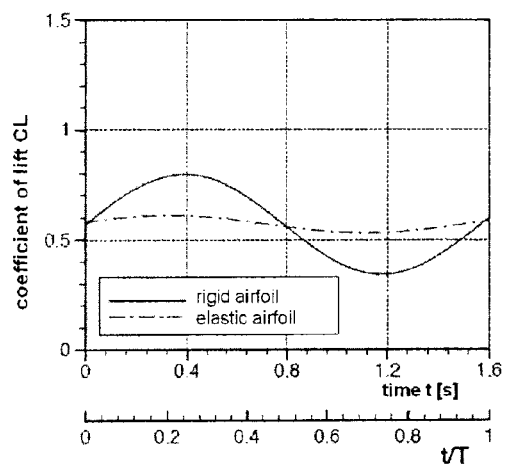
FIG. 35a is a graph showing influence of airfoil thickness on coefficient of lift $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 0005.
Figure 35B:
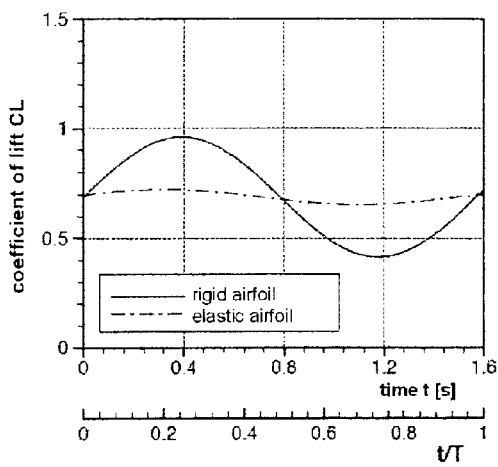
FIG. 35b is a graph showing influence of airfoil thickness on coefficient of lift $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 0030.
Figure 35C:
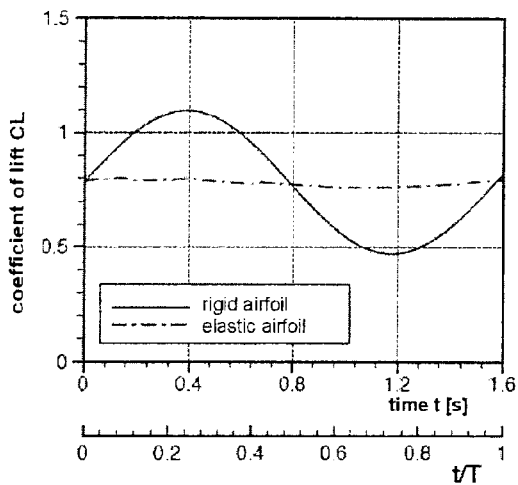
FIG. 35c is a graph showing influence of airfoil thickness on coefficient of lift $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 0050.
Figure 35D:
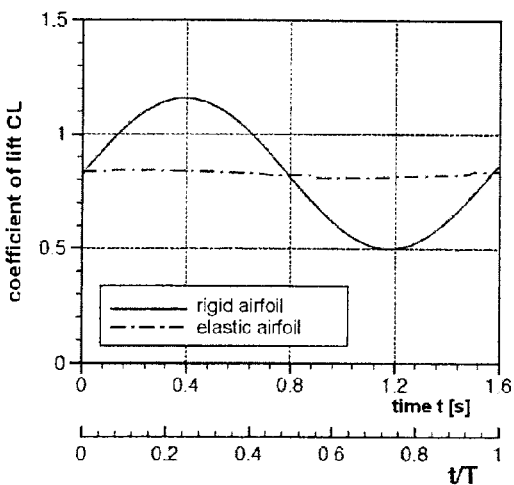
FIG. 35d is a graph showing influence of airfoil thickness on coefficient of lift $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 0060.
Figure 36A:
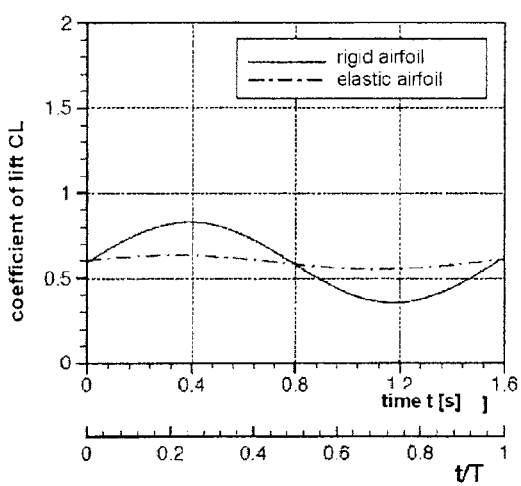
FIG. 36a is a graph showing influence of the airfoil camber on the lift coefficient $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 0010.
Figure 36B:
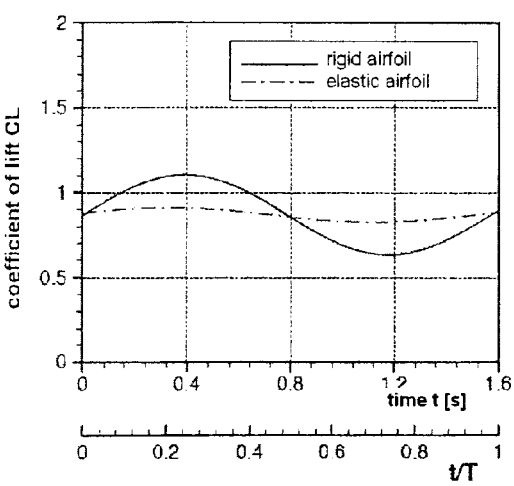
FIG. 36b is a graph showing influence of the airfoil camber on the lift coefficient $c_L$; $V_\infty=60$ m/s; $\alpha(t)=5°+2° \sin(4t)$; $x_{ie}=0.2$ $x_{te}=0.7$ $k_\gamma100$ Nm/rad; $d_\beta=1$ Nms/rad; i=3; NACA 2510.
Figure 36C:
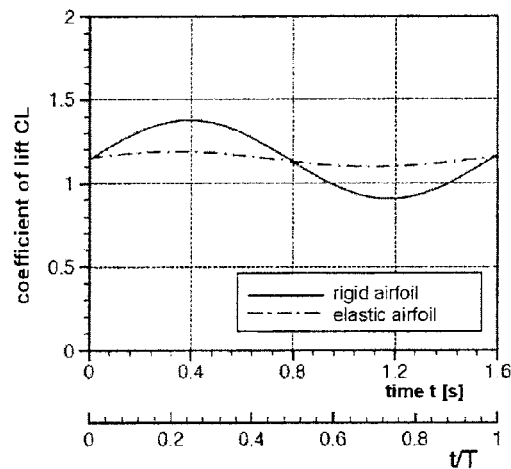
FIG. 36c is a graph showing influence of the airfoil camber on the lift coefficient $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 4510.
Figure 36D:
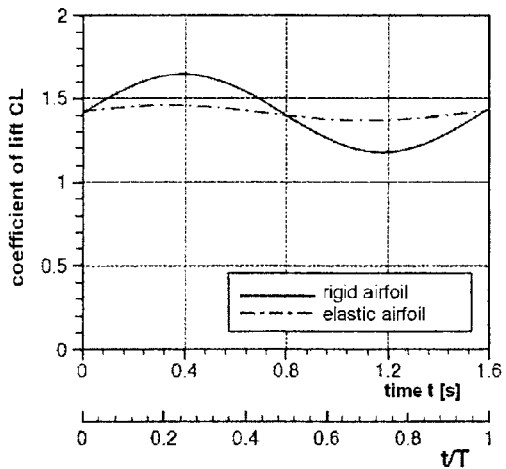
FIG. 36d is a graph showing influence of the airfoil camber on the lift coefficient $c_L$; $V_\infty=60$ m/s; $\alpha(t)=5°+2° \sin(4t)$; $x_{ie}=0.2$ $x_{te}=0.7$ $k_\gamma=100$ Nm/rad; $d_\beta=1$ Nms/rad; i=3; NACA 6510.

FIGS. 34a-34c show the courses of the lift upon variation of the lengths of the flaps. The length of the trailing edge flap is always kept constant. Nine configurations with lengths of the flaps of 10%, 20% and 30% of the chord, respectively, are examined. It can be inferred from the figures that the larger the leading edge flap becomes, the more the amplitudes are reduced. This results from the fact that a higher moment is generated on the leading edge, meaning that the deflections of the flaps increase. It is possible to infer from table 4.5 that a change in the trailing edge flap has less influence on the reduction of amplitude than in the leading edge flap. In the case of a leading edge flap of 30%, the reduction for all lengths of the trailing edge flaps is almost the same. However, in the case of $x_{le}$=10% and $x_{le}$=20%, an increase in reduction is suitable to be observed as the size of trailing edge flaps increases. Furthermore, another transition point is suitable to be observed. If the flap length of the leading edge is too large, the aerodynamic moment causes an excessive increase or decrease in camber; this is also suitable to be observed with regard to stiffness. The transition point is between 20% and 30% of the leading edge flap.

TABLE 4.5

Difference of coefficient of lift and minimum or maximum flap deflections upon variation of flap length

| Flap length [-] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| $x_{le}$ = 0.1 | | | | | | |
| $x_{te}$ = 0.7 | 0.608 | 39.2 | 0.39 | −0.41 | 1.16 | −1.23 |
| $x_{te}$ = 0.8 | 0.682 | 31.8 | 0.38 | −0.4 | 1.13 | −1.21 |
| $x_{te}$ = 0.9 | 0.762 | 23.8 | 0.39 | −0.42 | 1.17 | −1.27 |
| $x_{le}$ = 0.2 | | | | | | |
| $x_{te}$ = 0.7 | 0.215 | 78.5 | 0.82 | −0.84 | 2.45 | −2.52 |
| $x_{te}$ = 0.8 | 0.242 | 75.8 | 0.94 | −0.96 | 2.82 | −2.88 |
| $x_{te}$ = 0.9 | 0.50 | 65.0 | 1.14 | −1.15 | 3.42 | −3.46 |
| $x_{le}$ = 0.3 | | | | | | |
| $x_{te}$ = 0.7 | 0.081 | 91.9 | 1.09 | −1.11 | 3.26 | −3.34 |
| $x_{te}$ = 0.8 | 0.088 | 91.2 | 1.32 | −1.34 | 3.97 | −4.01 |
| $x_{te}$ = 0.9 | 0.089 | 91.1 | 1.74 | −1.73 | 5.22 | −5.19 |

The influence of the airfoil thickness is examined on the basis of symmetrical airfoils from the 4-digit NACA series. FIGS. 35a to 35d show the $c_L$ courses for four different airfoils. The $c_L$ courses of the rigid airfoils show that the amplitudes of the $c_L$-courses and therefore the flap moments become larger as the airfoil thickness increases. The flap deflections, however, increase insignificantly, as is suitable to be inferred from table 4.6. From this, it is suitable to be concluded that the flap deflections have a greater influence on the surrounding flow of the airfoil as the thickness of the airfoil increases. The reduction of the amplitudes increases much more than the flap deflections. For NACA 0060, a reduction of 94.9% is achieved.

TABLE 4.6

Difference of coefficient of lift and minimum or maximum flap deflections upon variation of airfoil thickness

| NACA | $\dfrac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 0005 | 0.173 | 82.7 | 0.86 | −0.86 | 2.58 | −2.58 |
| 0015 | 0.165 | 83.5 | 0.85 | −0.85 | 2.55 | −2.56 |
| 0030 | 0.128 | 87.2 | 0.87 | −0.87 | 2.61 | −2.61 |
| 0040 | 0.094 | 90.6 | 0.91 | −0.89 | 2.73 | −2.67 |
| 0050 | 0.067 | 93.3 | 0.92 | −0.90 | 2.77 | −2.71 |
| 0060 | 0.051 | 94.9 | 0.93 | −0.92 | 2.79 | −2.75 |

Furthermore, the airfoil camber was varied at a 4-digit NACA airfoil. The airfoil thickness is 10% and the maximum camber is located at 50% of the chord. The results are shown in Table 4.7. The corresponding reductions and flap deflections are provided in FIGS. 36a to 36d of the airfoil camber is of minor importance.

TABLE 4.7

Difference of coefficient of lift and minimum or maximum flap deflections upon variation of the airfoil camber

| NACA | $\dfrac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 0010 | 0.173 | 82.7 | 0.85 | −0.85 | 2.55 | −2.56 |
| 2510 | 0.181 | 81.9 | 0.84 | −0.85 | 2.52 | −2.54 |
| 4510 | 0.190 | 81.0 | 0.83 | −0.84 | 2.49 | −2.53 |
| 6510 | 0.194 | 80.6 | 0.82 | −0.84 | 2.47 | −2.52 |

Figure 37A:
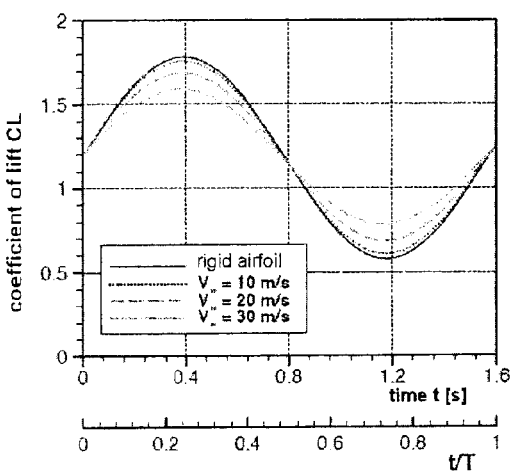
FIGS. 37a and 37b are graph showings influence of the freestream velocity $V_\infty$ on the coefficient of lift $c_L$; NACA $64_3618$; $\alpha(t)=5°+5° \sin(4t)$; $x_{ie}=0.2$; $x_{te}=0.7$; $k_\gamma=100$ Nm/rad; $d_\beta=1$ Nms/rad; i=3.
Figure 37B:
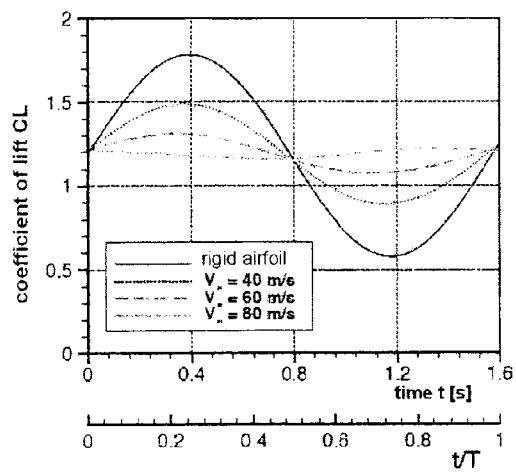

The influence of the freestream velocity on the $c_L$ course is shown in FIGS. 37a and 37b. As expected, the reduction increases with increasing freestream velocity; this is due to an increase of the moments. The velocity is incorporated into the flow forces in a quadratic manner. A transition point is hereby suitable to be observed again. Taking into consideration the results indicated in table 4.8, a freestream velocity between $V_\infty=60$ m/s and $V_\infty=80$ m/s is suitable to be assumed for the transition point. The largest reduction of the amplitudes is reached at $V_\infty=80$ m/s and is 94.8%.

TABLE 4.8

Difference of coefficient of lift and minimum or maximum flap deflections upon variation of the freestream velocity

| Freestream velocity [m/s] | $\dfrac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 10 | 0.955 | 4.5 | 0.11 | −0.12 | 0.34 | −0.37 |
| 20 | 0.833 | 16.7 | 0.41 | −0.45 | 1.24 | −1.33 |
| 30 | 0.668 | 33.2 | 0.83 | −0.87 | 2.49 | −2.62 |
| 40 | 0.495 | 50.5 | 1.27 | −1.32 | 3.81 | −3.97 |
| 60 | 0.196 | 80.4 | 2.03 | −2.11 | 6.08 | −6.33 |
| 80 | 0.052 | 94.8 | 2.56 | −2.68 | 7.67 | −8.04 |

The previous modifications of the angle of attack have been described via a sine oscillation. Considering an application in wind turbine generators, irregular modifications of the angle of attack are to be expected. Due to the fact that an adjustment of the parameters during operation is not possible within a passive concept, angle of attack courses of the following form are examined:

$$\alpha_1(t) = 5° + 2° \sin(0,5t)\cos(3t) \qquad (4.2)$$

$$\alpha_2(t) = 5° + 3° \sin(4t)\sin(0,2t)\cos(t) \qquad (4.3)$$

Figure 38:
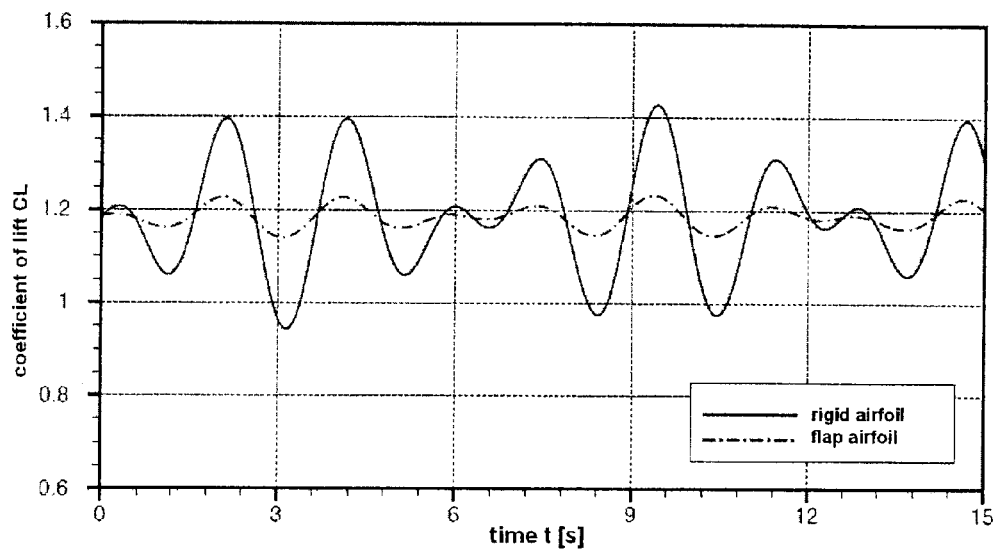
FIG. 38 is a graph showing influence of the angle of attack on the coefficient of lift $c_L$; NACA $64_3618$; $V_\infty=60$ m/s; $\alpha_1(t)=5°+2° \sin(0.5t)\cos(3t)$; $x_{ie}=0.2$; $x_{te}=0.7$; $k_\gamma=100$ Nm/rad; $d_\beta=1$ Nms/rad; i=3.
Figure 39:
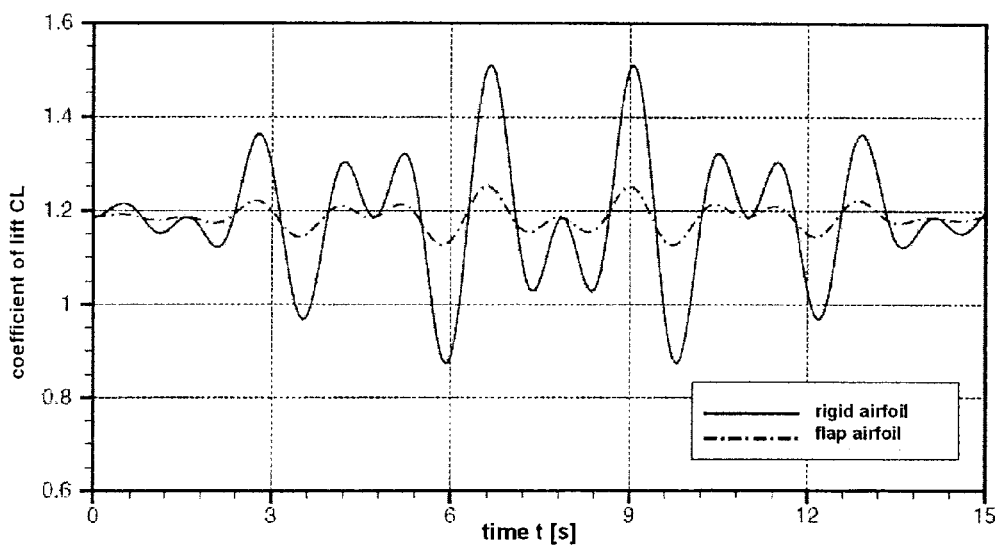
FIG. 39 is a graph showing influence of the angle of attack on coefficient of lift $c_L$; NACA $64_3618$; $V_\infty=60$ m/s; $\alpha_2(t)=5°+3° \sin(0.2t)\cos(t)$; $x_{ie}=0.2$; $x_{te}=0.7$; $k_\gamma=100$ Nm/rad; $d_\beta=1$ Nms/rad; i=3.

The results are shown in FIGS. 38 and 39. The reductions achieved are suitable to be inferred from table 4.9. In the present case, the average reduction of the amplitude amounts to 80%.

TABLE 4.9

Difference of coefficient of lift and minimum or maximum flap deflections upon variation of angle of attack

| Angle of attack [°] | $\dfrac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| $\alpha_1(t)$ | 0.192 | 80.8 | 0.82 | −0.83 | 2.46 | −2.5 |
| $\alpha_2(t)$ | 0.192 | 80.8 | 1.05 | −1.08 | 3.16 | −3.23 |

Example of Application NREL 5 MW RWT

The results of a calculated application of the concept on which the invention is based are presented in the following with a virtual reference wind turbine (RWT, 5 MW Reference Wind Turbine (RWT) from NREL).

It is hereby assumed that the modification of the angle of attack results from the atmospheric boundary layer. In its upper area, the system is then subjected to a higher wind velocity than in the lower area. The wind velocity $V_{Wind}$ is suitable to be described via the following equation:

$$V_{wind}(r, \psi) = V_{hub} \dfrac{\ln\left(\dfrac{h_{hub} + r\cos\psi}{z_0}\right)}{\ln\left(\dfrac{h_{hub}}{z_0}\right)} \qquad (5.1)$$

wherein $V_{hub}$ is the wind velocity on hub height, $\psi$ the rotation angle of the wing, r the radial position on the wing and $z_0$ the roughness length. Using the blade element theory, the distribution of the angles of attack along the wing is suitable to be calculated for each position of the rotor. The angles of attack used in this work are determined by Ferber (2010), wherein unsteady effects of the wake, the freestream and blade oscillations are not taken into account.

In this chapter, three radial positions are examined. In accordance with the discrete positions provided by NREL, they are referred to as $$RP12\left(\dfrac{r}{R} = 0.72\right), RP14\left(\dfrac{r}{R} = 0.86\right) \text{ and } RP16\left(\dfrac{r}{R} = 0.96\right)$$

(R=rotor blade length). The comparison of the radial positions is of minor importance for the application of such a concept, because different flap systems along the wing are conceivable. The behavior at different wind speeds on hub height is of much more interest. A roughness length $z_0$ of 1 m has been assumed for all calculations. The preload moment of the leading edge flap is defined via the angle of attack of the rotor vertically looking downwards.

Figure 40A:
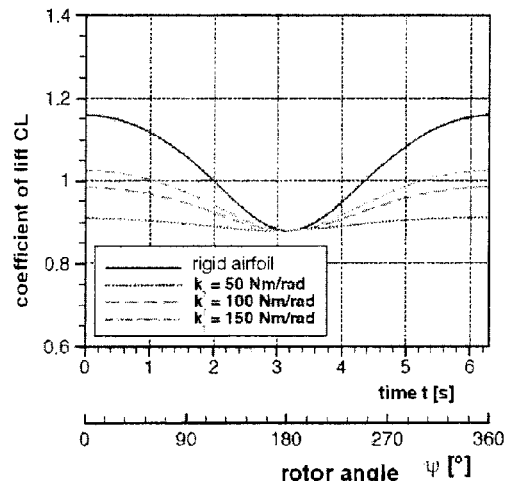
FIG. 40a is a graph showing NREL; radial position RP=12; NACA $64_3618$; $x_{ie}=0.2$; $x_{te}=0.7$; $d_\beta=1$ Nm/s; i=3; $V_{Wind}=8$ m/s.
Figure 40B:
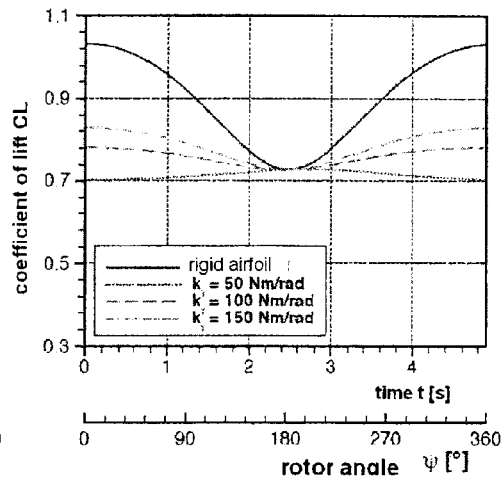
FIG. 40b is a graph showing NREL; radial position RP=12; NACA $64_3618$; $x_{ie}=0.2$; $x_{te}=0.7$; $d_\beta=1$ Nm/s; i=3; $V_{Wind}=12$ m/s.
Figure 41A:
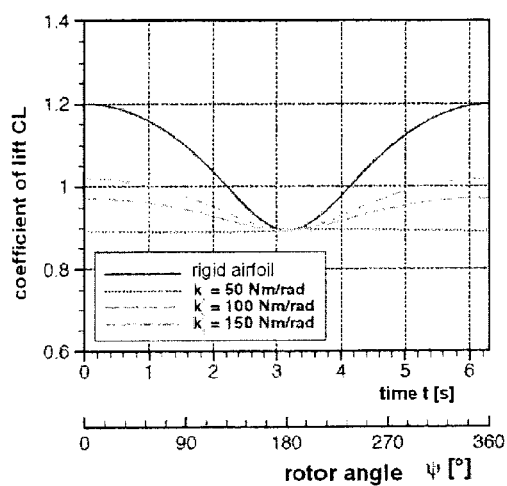
FIG. 41a is a graph showing NREL; radial position RP=14; NACA $64_3618$; $x_{ie}=0.2$; $x_{te}=0.7$; $d_\beta=1$ Nms/rad; i=3; $V_{Wind}=8$ m/s.
Figure 41B:
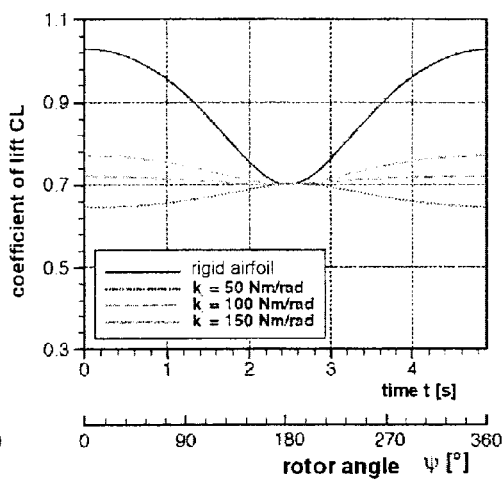
FIG. 41b is a graph showing NREL; radial position RP=14; NACA 643618; $x_{ie}=0.2$; $x_{te}=0.7$; $d_\beta=1$ Nms/rad; i=3; $V_{Wind}=12$ m/s.

For the different radial positions, different stiffnesses are examined. Taking into consideration the increasing freestream velocities in the external area of the rotor blade, an increasing change in camber is to be expected. The latter is confirmed via the results in FIGS. 40*a* to 42*b*. Particular attention hereby has to be paid to ensure that a transition point does not occur as stiffness decreases or velocity increases. This has occurred for some of the cases examined. A transition point means that the rotor provides less overall power. The compromise related to a passive concept directly results from this. By way of example, the reduction at RP12 for the velocity $V_{hub}=8$ m/s is 89% if a stiffness of $k_\gamma=50$ Nm/rad is used. If the velocity increases to 12 m/s, a load reduction of 91.9% is achieved with the same stiffness. FIG. 40*b* shows, however, that this reduction already occurs in case of a transition to low coefficients of lift. This has to be prevented. The reduction of the amplitudes therefore depends on the operating states and the achievement of a load reduction of 60% to 80%. All further values are suitable to be inferred from tables 5.1 to 5.6.

TABLE 5.1

Difference of coefficient of lift and minimum or maximum flap deflections for NREL; $V_{Wind} = 8$ m/s; radial position RP = 12;

NACA $64_3618$; $x_{le} = 0.2$; $x_{te} = 0.7$; $d_\beta = 1 \frac{Nms}{rad}$; i = 3

| Spring stiffness [Nm/s] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.110 | 89.0 | 1.05 | 0 | 3.16 | 0 |
| 100 | 0.376 | 62.4 | 0.74 | 0 | 2.21 | 0 |
| 150 | 0.520 | 48.0 | 0.57 | 0 | 1.70 | 0 |

TABLE 5.2

Difference of coefficient of lift and minimum or maximum flap deflections for NREL; $V_{Wind} = 12$ m/s; radial position RP = 12;

NACA $64_3618$; $x_{le} = 0.2$; $x_{te} = 0.7$; $d_\beta = 1 \frac{Nms}{rad}$; i = 3

| Spring stiffness [Nm/rad] | $\frac{(c_{Lmax} - c_{Lmin})_{elastic}}{(c_{Lmax} - c_{Lmin})_{tarr}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.0081 | 91.9 | 1.37 | 0 | 4.12 | 0 |
| 100 | 0.177 | 82.3 | 1.05 | 0 | 3.16 | 0 |
| 150 | 0.334 | 66.6 | 0.85 | 0 | 2.56 | 0 |

TABLE 5.3

Difference of coefficient of lift and minimum or maximum flap deflections for NREL; $V_{Wind} = 8$ m/s; radial position RP = 14;

NACA $64_3618$; $x_{le} = 0.2$; $x_{te} = 0.7$; $d_\beta = 1 \frac{Nm}{s}$; i = 3

| Spring stiffness [Nm/rad] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.023 | 93.7 | 1.30 | 0 | 3.89 | 0 |
| 100 | 0.254 | 74.6 | 0.96 | 0 | 2.88 | 0 |
| 150 | 0.409 | 59.1 | 0.76 | 0 | 2.29 | 0 |

TABLE 5.4

Difference of coefficient of lift and minimum or maximum flap deflections for NREL; $V_{Wind} = 12$ m/s; radial position RP = 14;

NACA $64_3618$; $x_{le} = 0.2$; $x_{te} = 0.7$; $d_\beta = 1 \frac{Nms}{rad}$; i = 3

| Spring stiffness [Nm/rad] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.169 | 83.1 | 1.60 | 0 | 4.81 | 0 |
| 100 | 0.062 | 93.8 | 1.29 | 0 | 3.88 | 0 |
| 150 | 0.214 | 78.6 | 1.08 | 0 | 3.25 | 0 |

TABLE 5.5

Difference of coefficient of lift and minimum or maximum flap deflections for NREL; $V_{Wind} = 8$ m/s; radial position RP = 16;

NACA $64_3618$; $x_{le} = 0.2$; $x_{te} = 0.7$; $d_\beta = 1 \frac{Nm}{s}$; i = 3

| Spring stiffness [Nm/rad] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.082 | 91.8 | 1.38 | 0 | 4.14 | 0 |
| 100 | 0.173 | 82.7 | 1.06 | 0 | 3.18 | 0 |
| 150 | 0.330 | 67.0 | 0.86 | 0 | 2.58 | 0 |

TABLE 5.6

Difference of coefficient of lift and minimum or maximum flap deflections for NREL; $V_{Wind} = 12$ m/s; radial position RP = 16;

NACA $64_3618$; $x_{le} = 0.2$; $x_{te} = 0.7$; $d_\beta = 1 \frac{Nms}{rad}$; i = 3

| Spring stiffness [Nm/rad] | $\frac{(c_{Lmax} - c_{Lmin})_{elastic}}{(c_{Lmax} - c_{Lmin})_{rigid}}$ | Reduction [%] | $\gamma_{max}$ [°] | $\gamma_{min}$ [°] | $\beta_{max}$ [°] | $\beta_{min}$ [°] |
|---|---|---|---|---|---|---|
| 50 | 0.220 | 88.0 | 1.71 | 0 | 5.12 | 0 |
| 100 | 0.019 | 98.1 | 1.42 | 0 | 4.26 | 0 |
| 150 | 0.135 | 86.5 | 1.21 | 0 | 3.64 | 0 |

Particularly preferably embodiments result from these and some other examinations for the range of parameters or relations of parameters presented hereinafter:
Stiffness, transmission ratio and the flap lengths have the greatest influences on the coefficient of lift. As stiffness decreases, the reduction of amplitude increases. For the transmission ratio, it has been shown that from a ratio of i=5 no significant improvement is suitable to be achieved. With regard to the flap lengths, it is possible to state that the variation of the leading edge flap has a greater influence than the modification of the trailing edge flaps. The airfoil camber has no influence on the reduction of loads. With different airfoil cambers, the same results are achieved. In contrast, the amplitudes of the loads—keeping the flap deflections constant—are suitable to be decreased as airfoil thickness increases.
For all observations, it has to be considered that there is one point in which a transition of the coefficient of lift occurs which is defined via a change of sign $$\frac{\delta c_L}{\delta \alpha}$$

This transition is to be avoided, especially in applications in conjunction with wind turbine generators. The mean coefficient of lift decreases due to the transition; the performance of the wind turbine generator subsequently decreases. This has to be taken into account with regard to the efficiency of the entire system.

As the freestream velocity increases, the flap deflections increase and thereby the reduction of the coefficient of lift. In order to avoid the aforementioned transition in the cL course, the dimensioning of the spring stiffness has to be adjusted to the freestream velocity in the design point.

Further Practical Embodiments

Practical Embodiment 1

The kinematics for the purpose of the rigid coupling is suitable to be carried out in various ways. In its simplest manifestation, it comprises a crank mechanism. The crank mechanism is schematically illustrated in FIG. 1 and FIG. 5. The core principle of the arrangement is that one control horn is fitted at the top (bottom) and the other at the bottom (top), so that one flap rotates clockwise, and the other flap simultaneously rotates anticlockwise.

In a further practical embodiment, the transmission ratio (L1/L2) has a value of 2 to 3.

In a further practical embodiment, the length of the leading edge flap is 15% to 20% of the chord, and the length of the trailing edge flap 20% to 30% of the chord.

In a further practical embodiment, a spring is mounted to the crank handle of the leading edge flap. This facilitates the setting of the system's operating range by overlaying the preload force of the spring on the flow forces acting on the leading edge. The ratio of the preload force to the rotation angle is defined by choosing the spring stiffness.

In a further practical embodiment, a damper is mounted on the crank handle of the trailing edge which stabilizes the system.

In a further practical embodiment, the rotary movement is limited to certain angles via mechanical end stops on the edges and/or flaps, thereby also limiting the rotary motion to certain angles; the operating range of the system is thereby also limited.

In a further practical embodiment, the aforementioned embodiments are combined: the kinematic coupling is arranged as a crank mechanism with crank rod, the transmission ratio is between 2 and 3, the length of the leading edge flap is between 15% and 20% and the length of the trailing edge flap is between 20% and 30%. A damper is mounted on the handle on the trailing edge flap, and the rotary movement of the flaps is limited by means of dampers.

In a further practical embodiment, the length of the crank mechanism is suitable to be modified. This modification is realized manually or actively via regulation and control. In a further practical embodiment, the length of the control horn on the trailing edge is suitable to be modified. This modification is realized manually or actively via regulation and control.

In a further practical embodiment, the length of the control horn on the leading edge is suitable to be modified. This modification is realized manually or actively via regulation and control.

In a further practical embodiment, the length of the control horn on the leading edge, the length of the control horn on the trailing edge and the length of the crank mechanism are suitable to be modified. These modifications are realized manually or actively via regulation and control.

For that purpose, the control horns and/or the crank mechanism are realized in the form of a gear, in particular of linear drives.

The invention claimed is:

1. A rotor blade comprising an aerodynamic airfoil, the airfoil having a pivot-mounted leading edge portion and a pivot-mounted trailing edge portion, wherein the airfoil is adapted to effect a lift due to pressure differences between a suction and pressure side of the airfoil, the pressure differences being caused by a camber of the airfoil in case of air flow over the rotor blade, wherein the rotor blade comprises means for modification of the camber, the means for modification of the camber being arranged on the leading edge portion of the airfoil and on the trailing edge portion of the airfoil, the means being adapted to provide a rigid mechanical coupling of a rotation of the trailing edge portion of the airfoil to a rotation of the leading edge portion of the airfoil around their respective pivots, the rotation of the leading edge portion being caused by a change of the pressure difference at the leading edge portion.

2. The rotor blade according to claim 1, wherein the means for modification of the camber comprise an element arranged on the leading edge portion and an element arranged on the trailing edge portion, the elements being arranged in an elastic manner and/or a rotatable manner.

3. The rotor blade according to claim 1, wherein the means for modification of the camber comprise an adjustable damping element, the adjustable damping element being adapted to effect a torque onto the leading edge upon rotation of the leading edge, the torque having a direction which is opposite to the direction of the rotation of the leading edge.

4. The rotor blade according to claim 3, wherein the adjustable damping element is provided at the trailing edge portion.

5. The rotor blade according to claim 1, wherein the means for modification of the camber are adapted to couple the rotation of the trailing edge portion to the rotation of the leading edge portion with a defined coupling ratio, the coupling ratio being indicative of the ratio of a rotation angle of the leading edge relative to the rotation angle of the trailing edge caused by the coupling means, the coupling ratio being adjustable.

6. The rotor blade according to claim 1, wherein a spring is provided on the leading edge portion, the spring being adapted to effect a torque onto the leading edge portion in case the leading edge portion is rotated away from its position of rest around its pivot, the torque being directed towards the position of rest of the leading edge portion.

7. The rotor blade according to claim 6, wherein the position of rest of the leading edge portion is adjustable by pre-stressing the spring.

8. The rotor blade according to claim 6, wherein the spring rate of the spring is adjustable.

9. The rotor blade according to claim 6, wherein the spring has a nonlinear spring characteristic curve.

10. The rotor blade according to claim 1, wherein mechanical stops are provided at the leading edge portion and/or the trailing edge portion the mechanical stops being adapted to limit a rotation of the leading edge portion and/or the trailing edge portion around their respective pivots.

11. The rotor blade according to claim 1, wherein the means for modification of the camber comprise a crank mechanism gear.

12. The rotor blade according to claim 1, wherein the means for modification of the camber comprise a crank rod.

13. The rotor blade according to claim 12, wherein the crank rod is coupled to a first control horn and to a second control horn, the first control horn being coupled to the leading edge portion, the second control horn being coupled to the trailing edge portion, wherein the first control horn is arranged looking upwards and the second control horn is arranged looking downwards.

14. The rotor blade according to claim 12, the crank rod being adapted to cause a clockwise rotation of the trailing edge portion in case of a counterclockwise rotation of the leading edge portion relative to their respective pivots, and vice versa.

15. The rotor blade according to claim 1, wherein in case the leading edge portion is rotated about its pivots due to a pressure change, the mechanical coupling is adapted to cause a simultaneous rotation of the trailing edge portion.

16. A wind turbine generator with at least one rotor blade according to claim 1.

17. The wind turbine generator according to claim 16, wherein the wind turbine generator comprises a regulation or control which—depending on the measured flow conditions—modifies the amount or the direction of the stiffness of the rotor blade and/or the strength of the coupling and/or the damping.

\* \* \* \* \*